US011421084B2

(12) United States Patent
Hopkins et al.

(10) Patent No.: US 11,421,084 B2
(45) Date of Patent: Aug. 23, 2022

(54) DISPERSIBLE ANTIMICROBIAL COMPLEX AND COATINGS THEREFROM

(71) Applicant: Poly Group LLC, New Albany, IN (US)

(72) Inventors: Thomas E. Hopkins, Goshen, KY (US); Craig A. Kalmer, Louisville, KY (US)

(73) Assignee: Poly Group LLC, New Albany, IN (US)

( * ) Notice: Subject to any disclaimer, the term of this patent is extended or adjusted under 35 U.S.C. 154(b) by 50 days.

(21) Appl. No.: 16/938,680

(22) Filed: Jul. 24, 2020

(65) Prior Publication Data

US 2020/0354527 A1    Nov. 12, 2020

Related U.S. Application Data

(63) Continuation of application No. 15/992,033, filed on May 29, 2018, now abandoned.

(60) Provisional application No. 62/511,975, filed on May 27, 2017.

(51) Int. Cl.

| | |
|---|---|
| *C08J 3/03* | (2006.01) |
| *C11D 1/04* | (2006.01) |
| *C11D 1/22* | (2006.01) |
| *C11D 1/14* | (2006.01) |
| *C08G 73/02* | (2006.01) |
| *C09D 5/02* | (2006.01) |
| *C11D 1/34* | (2006.01) |
| *A01N 25/04* | (2006.01) |
| *A01N 25/10* | (2006.01) |
| *A01N 25/30* | (2006.01) |
| *A01N 25/22* | (2006.01) |

(52) U.S. Cl.
CPC ............... *C08J 3/03* (2013.01); *A01N 25/04* (2013.01); *A01N 25/10* (2013.01); *A01N 25/22* (2013.01); *A01N 25/30* (2013.01); *C08G 73/0226* (2013.01); *C09D 5/025* (2013.01); *C11D 1/04* (2013.01); *C11D 1/146* (2013.01); *C11D 1/22* (2013.01); *C11D 1/342* (2013.01); *C08J 2371/02* (2013.01); *C08J 2379/02* (2013.01)

(58) Field of Classification Search
None
See application file for complete search history.

(56) References Cited

U.S. PATENT DOCUMENTS

| | | |
|---|---|---|
| 2,717,887 A | 9/1955 | Saner |
| 2,882,157 A | 4/1959 | Thompson et al. |
| 2,972,535 A | 2/1961 | Laakso et al. |
| 3,140,227 A | 7/1964 | Roth et al. |
| 3,227,672 A | 1/1966 | Fertig et al. |
| 3,262,807 A | 7/1966 | Sterman et al. |
| 3,296,167 A | 1/1967 | Turner et al. |
| 3,296,196 A | 1/1967 | Lamoreaux |
| 3,328,328 A | 6/1967 | Scanley |
| 3,450,794 A | 6/1969 | Ebneth et al. |
| 3,592,805 A | 7/1971 | Szabo et al. |
| 3,597,313 A | 8/1971 | Coscia et al. |
| 3,619,200 A | 11/1971 | Ferguson et al. |
| 3,753,716 A | 8/1973 | Ishihara et al. |
| 3,871,376 A | 3/1975 | Kozak |
| 3,872,128 A | 3/1975 | Byck |
| 3,898,188 A | 8/1975 | Rembaum et al. |
| 3,929,741 A | 12/1975 | Laskey |
| 3,975,350 A | 8/1976 | Hudgin et al. |
| 4,011,178 A | 3/1977 | Muse |
| 4,017,440 A | 4/1977 | Killam |
| 4,026,941 A | 5/1977 | Login et al. |
| 4,029,694 A | 6/1977 | Weipert et al. |
| 4,069,365 A * | 1/1978 | Rembaum ................ B01J 41/14 149/19.9 |
| 4,070,189 A | 1/1978 | Kelley et al. |
| 4,080,315 A | 3/1978 | Login |
| 4,081,419 A | 3/1978 | Shimizu et al. |
| 4,093,676 A | 6/1978 | Weipert et al. |
| 4,098,842 A | 7/1978 | Login |
| 4,104,443 A | 8/1978 | Latta et al. |

(Continued)

FOREIGN PATENT DOCUMENTS

| | | |
|---|---|---|
| DE | 3339662 A1 | 5/1984 |
| DE | 19833062 A1 | 2/2000 |

(Continued)

OTHER PUBLICATIONS

U.S. Appl. No. 11/509,915 Office Action dated Mar. 9, 2010.
U.S. Appl. No. 11/509,915 Amendment dated Aug. 9, 2010.
U.S. Appl. No. 11/509,915 Office Action dated May 12, 2011.
U.S. Appl. No. 11/509,915 Amendment dated Sep. 12, 2011.
U.S. Appl. No. 11/509,915 Advisory Action dated Sep. 29, 2011.

(Continued)

*Primary Examiner* — Nicole M. Buie-Hatcher
(74) *Attorney, Agent, or Firm* — Strategic Innovation IP Law Offices, P.C.

(57) ABSTRACT

Disclosed are latexes, suspensions, and colloids having a cationic antimicrobial compound complexed with an anionic surfactant. The surfactant may have greater affinity for the antimicrobial compound than other anionic surfactants and other anions in the latex, suspension, or colloid that contribute to disperse phase stability to prevent disrupting the dispersions. Dispersions containing the antimicrobial compound may therefore have a shelf life comparable to dispersions that are otherwise identical but lack the cationic antimicrobial compound and its complexed anionic surfactant. Coatings made with the complexes can exhibit essentially undiminished antimicrobial activity.

19 Claims, No Drawings

(56) References Cited

U.S. PATENT DOCUMENTS

| | | |
|---|---|---|
| 4,119,094 A | 10/1978 | Micklus et al. |
| 4,125,110 A | 11/1978 | Hymes |
| 4,147,550 A | 4/1979 | Campbell et al. |
| 4,152,307 A | 5/1979 | Shibahara et al. |
| 4,181,752 A | 1/1980 | Martens et al. |
| 4,191,743 A | 3/1980 | Klemm et al. |
| 4,226,232 A | 10/1980 | Spence |
| 4,226,748 A | 10/1980 | Matsunaga et al. |
| 4,229,554 A | 10/1980 | Newkirk et al. |
| 4,234,381 A | 11/1980 | Killam |
| 4,256,800 A | 3/1981 | Stockhausen et al. |
| 4,259,411 A | 3/1981 | Windhager et al. |
| 4,304,703 A | 12/1981 | Das |
| 4,306,996 A | 12/1981 | Windhager |
| 4,318,947 A | 3/1982 | Joung |
| 4,332,919 A | 6/1982 | Kobayashi et al. |
| 4,361,623 A | 11/1982 | Newkirk et al. |
| 4,366,238 A | 12/1982 | Yokoyama et al. |
| 4,373,009 A | 2/1983 | Winn |
| 4,377,667 A | 3/1983 | Sakurai et al. |
| 4,384,078 A | 5/1983 | Ohya et al. |
| 4,391,278 A | 7/1983 | Cahalan et al. |
| 4,393,048 A | 7/1983 | Mason, Jr. et al. |
| 4,414,353 A | 11/1983 | Maslanka et al. |
| 4,416,668 A | 11/1983 | Thompson |
| RE31,454 E | 12/1983 | Hymes |
| 4,459,289 A | 7/1984 | Maltz |
| 4,480,075 A | 10/1984 | Willis |
| 4,482,680 A | 11/1984 | Sheldon et al. |
| 4,500,517 A | 2/1985 | Luss |
| 4,506,070 A | 3/1985 | Ben |
| 4,515,162 A | 5/1985 | Yamamoto et al. |
| 4,515,593 A | 5/1985 | Norton |
| 4,539,996 A | 9/1985 | Engel |
| 4,543,390 A | 9/1985 | Tanaka et al. |
| 4,546,140 A | 10/1985 | Shih |
| 4,563,184 A | 1/1986 | Korol |
| 4,570,629 A | 2/1986 | Widra |
| 4,581,821 A | 4/1986 | Cahalan et al. |
| 4,617,343 A | 10/1986 | Walker et al. |
| 4,632,881 A | 12/1986 | Trotz et al. |
| 4,657,006 A | 4/1987 | Rawlings et al. |
| 4,659,785 A | 4/1987 | Nagano et al. |
| 4,668,748 A | 5/1987 | Hardam et al. |
| 4,674,512 A | 6/1987 | Rolf |
| 4,699,146 A | 10/1987 | Sieverding |
| 4,705,709 A | 11/1987 | Vailancourt |
| 4,722,965 A | 2/1988 | Wong et al. |
| 4,728,323 A | 3/1988 | Matson |
| 4,735,991 A | 4/1988 | Guioth et al. |
| 4,740,546 A | 4/1988 | Masuda et al. |
| 4,762,862 A | 8/1988 | Yada et al. |
| 4,768,523 A | 9/1988 | Cahalan et al. |
| 4,769,013 A | 9/1988 | Lorenz et al. |
| 4,777,954 A | 10/1988 | Keusch et al. |
| 4,791,063 A | 12/1988 | Hou et al. |
| 4,810,567 A | 3/1989 | Calcaterra et al. |
| 4,816,508 A | 3/1989 | Chen |
| 4,831,098 A | 5/1989 | Watanabe et al. |
| 4,841,021 A | 6/1989 | Katritzky et al. |
| 4,842,768 A | 6/1989 | Nakao et al. |
| 4,848,353 A | 7/1989 | Engel |
| 4,857,585 A | 8/1989 | Leising |
| 4,857,590 A | 8/1989 | Gaggar et al. |
| 4,859,727 A | 8/1989 | Sasaki et al. |
| 4,876,278 A | 10/1989 | Taylor et al. |
| 4,877,687 A | 10/1989 | Azegami et al. |
| 4,891,306 A | 1/1990 | Yokoyama et al. |
| 4,898,908 A | 2/1990 | Lahalih et al. |
| 4,900,543 A | 2/1990 | Ritter et al. |
| 4,900,544 A | 2/1990 | Ritter et al. |
| 4,920,166 A | 4/1990 | Buysch et al. |
| 4,931,506 A | 6/1990 | Yu |
| 4,931,522 A | 6/1990 | Catena |
| 4,943,612 A | 7/1990 | Morita et al. |
| 4,947,847 A | 8/1990 | Nakao et al. |
| 4,948,720 A | 8/1990 | Chen et al. |
| 4,954,636 A | 9/1990 | Merianos et al. |
| 4,957,908 A | 9/1990 | Nelson |
| 4,981,936 A | 1/1991 | Good et al. |
| 4,997,697 A | 3/1991 | Malhotra |
| 4,999,249 A | 3/1991 | Deschler et al. |
| 5,004,760 A | 4/1991 | Patton et al. |
| 5,006,267 A | 4/1991 | Vaughn et al. |
| 5,010,139 A | 4/1991 | Yu |
| 5,019,096 A | 5/1991 | Fox, Jr. et al. |
| 5,024,840 A | 6/1991 | Blakely et al. |
| 5,043,195 A | 8/1991 | Skrivseth |
| 5,049,383 A | 9/1991 | Huth et al. |
| 5,055,171 A | 10/1991 | Peck |
| 5,057,560 A | 10/1991 | Mueller |
| 5,059,629 A | 10/1991 | Patton et al. |
| 5,061,752 A | 10/1991 | Buysch et al. |
| 5,069,907 A | 12/1991 | Mixon et al. |
| 5,080,097 A | 1/1992 | Eisenberg |
| 5,081,182 A | 1/1992 | Robinson et al. |
| 5,082,697 A | 1/1992 | Patton et al. |
| 5,124,076 A | 6/1992 | Smuckler |
| 5,142,010 A | 8/1992 | Olstein |
| 5,153,321 A | 10/1992 | Finter et al. |
| 5,175,059 A | 12/1992 | Yamamoto et al. |
| 5,183,576 A | 2/1993 | Wood et al. |
| 5,194,539 A | 3/1993 | Charmot et al. |
| 5,205,297 A | 4/1993 | Montecalvo et al. |
| 5,247,008 A | 9/1993 | Michels et al. |
| 5,255,979 A | 10/1993 | Ferrari |
| 5,263,481 A | 11/1993 | Axelgaard |
| 5,264,249 A | 11/1993 | Perrault et al. |
| 5,269,770 A | 12/1993 | Conway et al. |
| 5,271,943 A | 12/1993 | Bogart et al. |
| 5,290,894 A | 3/1994 | Melrose et al. |
| 5,312,863 A | 5/1994 | Van Rheenen et al. |
| 5,314,924 A | 5/1994 | Lee |
| 5,317,063 A | 5/1994 | Komatsu et al. |
| 5,330,527 A | 7/1994 | Montecalvo et al. |
| 5,336,717 A | 8/1994 | Rolando et al. |
| 5,346,956 A | 9/1994 | Gnanou |
| 5,354,790 A | 10/1994 | Keusch et al. |
| 5,358,688 A | 10/1994 | Robertson |
| 5,369,179 A | 11/1994 | Havens |
| 5,370,981 A | 12/1994 | Krafft et al. |
| 5,402,884 A | 4/1995 | Gilman et al. |
| 5,403,587 A | 4/1995 | McCue et al. |
| 5,403,640 A | 4/1995 | Krishnan et al. |
| 5,403,883 A | 4/1995 | Messner et al. |
| 5,420,197 A | 5/1995 | Lorenz et al. |
| 5,421,982 A | 6/1995 | Ikeda et al. |
| 5,429,590 A | 7/1995 | Saito et al. |
| 5,432,000 A | 7/1995 | Young, Sr. et al. |
| 5,447,643 A | 9/1995 | Kelkenberg et al. |
| 5,466,256 A | 11/1995 | McAdams et al. |
| 5,470,916 A | 11/1995 | Righetti et al. |
| 5,474,065 A | 12/1995 | Meathrel et al. |
| 5,480,717 A | 1/1996 | Kundel |
| 5,489,437 A | 2/1996 | Marra |
| 5,494,987 A | 2/1996 | Imazato et al. |
| 5,498,478 A | 3/1996 | Hansen et al. |
| 5,509,899 A | 4/1996 | Fan et al. |
| 5,512,329 A | 4/1996 | Guire et al. |
| 5,515,117 A | 5/1996 | Dziabo et al. |
| 5,518,788 A | 5/1996 | Invie |
| 5,520,180 A | 5/1996 | Uy et al. |
| 5,520,910 A | 5/1996 | Hashimoto et al. |
| 5,525,356 A | 6/1996 | Jevne et al. |
| 5,533,971 A | 7/1996 | Phipps |
| 5,536,446 A | 7/1996 | Uy et al. |
| 5,536,494 A | 7/1996 | Park |
| 5,536,861 A | 7/1996 | Robertson |
| 5,563,056 A | 10/1996 | Swan et al. |
| 5,591,799 A | 1/1997 | Bott et al. |
| 5,597,661 A | 1/1997 | Takeuchi et al. |
| 5,599,321 A | 2/1997 | Conway et al. |
| 5,608,021 A | 3/1997 | Uchiyama et al. |
| 5,614,538 A | 3/1997 | Nelson, Jr. |

(56) References Cited

U.S. PATENT DOCUMENTS

| | | |
|---|---|---|
| 5,614,586 A | 3/1997 | Tang et al. |
| 5,618,586 A | 4/1997 | Swarup et al. |
| 5,622,168 A | 4/1997 | Keusch et al. |
| 5,624,704 A | 4/1997 | Darouiche et al. |
| 5,645,968 A | 7/1997 | Sacripante et al. |
| 5,646,197 A | 7/1997 | Martin |
| 5,654,369 A | 8/1997 | Tsubaki et al. |
| 5,665,477 A | 9/1997 | Meathrel et al. |
| 5,667,913 A | 9/1997 | Chen et al. |
| 5,670,557 A | 9/1997 | Dietz et al. |
| 5,674,275 A | 10/1997 | Tang et al. |
| 5,674,561 A | 10/1997 | Dietz et al. |
| 5,688,855 A | 11/1997 | Stoy et al. |
| 5,700,742 A | 12/1997 | Payne |
| 5,725,789 A | 3/1998 | Huber et al. |
| 5,773,507 A | 6/1998 | Incorvia et al. |
| 5,779,632 A | 7/1998 | Dietz et al. |
| 5,798,048 A | 8/1998 | Ries |
| 5,798,096 A | 8/1998 | Pavlyk |
| 5,800,685 A | 9/1998 | Perrault |
| 5,821,280 A | 10/1998 | Suda et al. |
| 5,830,934 A | 11/1998 | Krishnan |
| 5,830,983 A | 11/1998 | Alex et al. |
| 5,834,561 A | 11/1998 | Fukumoto et al. |
| 5,849,045 A | 12/1998 | Chen et al. |
| 5,849,822 A | 12/1998 | Kido et al. |
| 5,874,184 A | 2/1999 | Takeuchi et al. |
| 5,886,098 A | 3/1999 | Ueda et al. |
| 5,907,017 A | 5/1999 | Ober et al. |
| 5,916,917 A | 6/1999 | Suh et al. |
| 5,967,714 A | 10/1999 | Ottersbach et al. |
| 5,984,102 A | 11/1999 | Tay |
| 5,985,990 A | 11/1999 | Kantner et al. |
| 5,997,815 A | 12/1999 | Anders et al. |
| 6,013,275 A | 1/2000 | Konagaya et al. |
| 6,015,836 A | 1/2000 | Martin |
| 6,022,553 A | 2/2000 | Anders et al. |
| 6,024,895 A | 2/2000 | Shimizu et al. |
| 6,038,464 A | 3/2000 | Axelgaard et al. |
| 6,039,940 A | 3/2000 | Perrault et al. |
| 6,045,919 A | 4/2000 | Alex et al. |
| 6,050,979 A | 4/2000 | Haemmerle et al. |
| 6,090,459 A | 7/2000 | Jadamus et al. |
| 6,096,800 A | 8/2000 | Ottersbach et al. |
| 6,103,368 A | 8/2000 | Fukuda et al. |
| 6,114,467 A | 9/2000 | Ober et al. |
| 6,127,105 A | 10/2000 | Vandenabeele |
| 6,187,856 B1 | 2/2001 | Incorvia et al. |
| 6,194,530 B1 | 2/2001 | Klesse et al. |
| 6,197,322 B1 | 3/2001 | Dutkiewicz et al. |
| 6,203,856 B1 | 3/2001 | Ottersbach et al. |
| 6,207,361 B1 | 3/2001 | Greener et al. |
| 6,218,492 B1 | 4/2001 | Hill et al. |
| 6,221,425 B1 | 4/2001 | Michal et al. |
| 6,242,526 B1 | 6/2001 | Siddiqui et al. |
| 6,248,811 B1 | 6/2001 | Ottersbach et al. |
| 6,251,967 B1 | 6/2001 | Perichaud et al. |
| 6,266,490 B1 | 7/2001 | Mukai et al. |
| 6,280,509 B1 | 8/2001 | Mallow |
| 6,319,883 B1 | 11/2001 | Graham et al. |
| 6,358,557 B1 | 3/2002 | Wang et al. |
| 6,368,587 B1 | 4/2002 | Anders et al. |
| 6,410,040 B1 | 6/2002 | Melrose et al. |
| 6,428,866 B1 | 8/2002 | Jadamus et al. |
| 6,482,781 B2 | 11/2002 | Graham et al. |
| 6,497,868 B1 | 12/2002 | Tanahashi |
| 6,500,981 B1 | 12/2002 | Weipert |
| 6,511,669 B1 | 1/2003 | Gamier et al. |
| 6,525,134 B1 | 2/2003 | Lacroix et al. |
| 6,537,663 B1 | 3/2003 | Chang et al. |
| 6,559,116 B1 | 5/2003 | Godfroid et al. |
| 6,583,228 B2 | 6/2003 | Nkansah et al. |
| 6,689,856 B2 | 2/2004 | L'Alloret |
| 6,750,296 B2 | 6/2004 | Ober et al. |
| 6,767,647 B2 | 7/2004 | Swofford et al. |
| 6,797,743 B2 | 9/2004 | McDonald |
| 6,800,278 B1 | 10/2004 | Perrault et al. |
| 6,815,074 B2 | 11/2004 | Aguado et al. |
| 6,815,502 B1 | 11/2004 | Lang et al. |
| 6,821,943 B2 | 11/2004 | Avery et al. |
| 6,852,353 B2 | 2/2005 | Qiu et al. |
| 7,112,559 B1 | 9/2006 | Mayhall et al. |
| 8,343,473 B2 | 1/2013 | Youngblood et al. |
| 8,349,300 B2 | 1/2013 | Wells et al. |
| 9,131,683 B2 | 9/2015 | Gisser et al. |
| 9,289,378 B2 | 3/2016 | Karandikar et al. |
| 11,134,684 B2 | 10/2021 | Youngblood et al. |
| 2001/0007694 A1 | 7/2001 | Ottersbach et al. |
| 2001/0044482 A1 | 11/2001 | Hu et al. |
| 2001/0050478 A1 | 12/2001 | Schmitz |
| 2002/0037955 A1 | 3/2002 | Baumann et al. |
| 2002/0081923 A1 | 6/2002 | Artley et al. |
| 2002/0086160 A1 | 7/2002 | Qiu et al. |
| 2002/0139583 A1 | 10/2002 | Masui et al. |
| 2002/0168473 A1 | 11/2002 | Ottersbach et al. |
| 2002/0177828 A1 | 11/2002 | Batich et al. |
| 2003/0013624 A1 | 1/2003 | Graham et al. |
| 2003/0017194 A1 | 1/2003 | Joerger et al. |
| 2003/0019813 A1 | 1/2003 | Ottersbach et al. |
| 2003/0022576 A1 | 1/2003 | Ottersbach et al. |
| 2003/0049437 A1 | 3/2003 | Devaney et al. |
| 2003/0068440 A1 | 4/2003 | Ottersbach et al. |
| 2003/0091641 A1 | 5/2003 | Tiller et al. |
| 2003/0108507 A1 | 6/2003 | Clipson et al. |
| 2003/0161804 A1 | 8/2003 | Perron et al. |
| 2003/0229185 A1 | 12/2003 | Chen et al. |
| 2003/0236376 A1 | 12/2003 | Kindt-Larsen et al. |
| 2004/0009136 A1 | 1/2004 | Dubief et al. |
| 2004/0135967 A1 | 7/2004 | Carney et al. |
| 2004/0202639 A1 | 10/2004 | DeGrado et al. |
| 2005/0003163 A1 | 1/2005 | Krishnan |
| 2005/0008676 A1 | 1/2005 | Qiu et al. |
| 2005/0008839 A1 | 1/2005 | Cramer et al. |
| 2005/0013842 A1 | 1/2005 | Qiu et al. |
| 2005/0032931 A1 | 2/2005 | Naisby et al. |
| 2005/0053569 A1 | 3/2005 | Bavouzet et al. |
| 2005/0058844 A1 | 3/2005 | Rubner et al. |
| 2005/0065284 A1 | 3/2005 | Krishnan |
| 2005/0101740 A1 | 5/2005 | Mougin |
| 2006/0057209 A1 | 3/2006 | Chapman et al. |
| 2006/0083854 A1 | 4/2006 | Ober et al. |
| 2006/0189710 A1 | 8/2006 | Hayashi et al. |
| 2007/0048249 A1 | 3/2007 | Youngblood et al. |
| 2007/0053867 A1 | 3/2007 | Ober et al. |
| 2007/0106040 A1 | 5/2007 | Ober et al. |
| 2007/0149694 A1 | 6/2007 | Krishnan |
| 2008/0226584 A1 | 9/2008 | Krishnan |
| 2009/0081367 A1 | 3/2009 | Makuta et al. |
| 2009/0311302 A1 | 12/2009 | Youngblood et al. |
| 2012/0046378 A1 | 2/2012 | Sloan |
| 2013/0079481 A1 | 3/2013 | Youngblood et al. |
| 2013/0109794 A1 | 5/2013 | Polzin et al. |
| 2013/0115185 A1 | 5/2013 | Tamareselvy et al. |
| 2013/0136783 A1 | 5/2013 | Youngblood et al. |
| 2014/0080977 A1 | 3/2014 | Youngblood et al. |
| 2014/0127320 A1 | 5/2014 | Salamone et al. |
| 2015/0093424 A1 | 4/2015 | Lapitsky et al. |
| 2016/0053038 A1 | 2/2016 | Youngblood et al. |
| 2016/0262392 A1 | 9/2016 | Youngblood et al. |
| 2017/0360688 A1 | 12/2017 | Fevola et al. |
| 2018/0237686 A1 | 8/2018 | Schnoor et al. |
| 2018/0340046 A1 | 11/2018 | Hopkins et al. |
| 2018/0362678 A1 | 12/2018 | Hopkins et al. |
| 2020/0369800 A1 | 11/2020 | Hopkins et al. |
| 2021/0084898 A1 | 3/2021 | Youngblood et al. |

FOREIGN PATENT DOCUMENTS

| | | |
|---|---|---|
| DE | 19910811 | 9/2000 |
| EP | 0000426 A1 | 1/1979 |
| EP | 0085327 A1 | 8/1983 |
| EP | 0099209 | 1/1984 |
| EP | 0141628 A1 | 5/1985 |
| EP | 0239213 A2 | 9/1987 |

(56) References Cited

FOREIGN PATENT DOCUMENTS

| | | | | |
|---|---|---|---|---|
| EP | 0286009 | A2 | 10/1988 | |
| EP | 0337474 | | 10/1989 | |
| EP | 375350 | A2 | 6/1990 | |
| EP | 0204312 | B1 | 8/1990 | |
| EP | 0469196 | A1 | 2/1992 | |
| EP | 0604369 | A1 | 6/1994 | |
| EP | 0290676 | B1 | 8/1994 | |
| EP | 0747456 | A2 | 12/1996 | |
| EP | 1109845 | B1 | 10/2005 | |
| GB | 1299012 | | 12/1972 | |
| GB | 1350400 | A | 4/1974 | |
| GB | 2091277 | A | 7/1982 | |
| JP | H05286811 | | 11/1993 | |
| JP | 2002-105152 | | 4/2002 | |
| WO | WO 91/12282 | | 8/1991 | |
| WO | WO 92/06694 | | 4/1992 | |
| WO | WO 95/27530 | | 10/1995 | |
| WO | WO 97/14448 | | 4/1997 | |
| WO | WO 97/15603 | | 5/1997 | |
| WO | WO-9735542 | A1 * | 10/1997 | ............ A61K 8/891 |
| WO | WO 97/45468 | | 12/1997 | |
| WO | WO 98/19311 | | 5/1998 | |
| WO | WO 98/29463 | | 7/1998 | |
| WO | WO 98/51720 | | 11/1998 | |
| WO | WO 99/09837 | | 3/1999 | |
| WO | WO 00/05283 | | 2/2000 | |
| WO | WO 00/08077 | | 2/2000 | |
| WO | WO 00/71591 | A1 | 11/2000 | |
| WO | WO-03028767 | A2 * | 4/2003 | ............ C08L 33/06 |
| WO | WO2004/045755 | A2 | 6/2004 | |
| WO | WO2013/185058 | A2 | 12/2013 | |
| WO | WO2017/003923 | A1 | 1/2017 | |
| WO | WO2018/222622 | A1 | 12/2018 | |
| WO | WO2018/232417 | A1 | 12/2018 | |

OTHER PUBLICATIONS

U.S. Appl. No. 11/509,915 Request for Continued Examination dated Oct. 11, 2011.
U.S. Appl. No. 12/549,004 Office Action dated May 4, 2012.
U.S. Appl. No. 12/549,004 Interview Summary dated Aug. 23, 2012.
U.S. Appl. No. 12/549,004 Interview Summary dated Sep. 11, 2012.
U.S. Appl. No. 12/549,004 Amendment dated Sep. 13, 2012.
U.S. Appl. No. 12/549,004 Notice of Allowance dated Nov. 19, 2012.
U.S. Appl. No. 13/682,159 Office Action dated Mar. 1, 2013.
U.S. Appl. No. 11/509,915 Office Action dated Jun. 13, 2013.
U.S. Appl. No. 13/682,159 Amendment dated Jun. 28, 2013.
U.S. Appl. No. 13/682,159 Office Action dated Aug. 20, 2013.
U.S. Appl. No. 13/748,290 Office Action dated Aug. 22, 2013.
U.S. Appl. No. 11/509,915 Amendment dated Nov. 13, 2013.
U.S. Appl. No. 11/509,915 Office Action dated Jan. 7, 2014.
U.S. Appl. No. 14/087,188 Office Action dated Mar. 7, 2014.
U.S. Appl. No. 14/087,188 Response dated Sep. 8, 2014.
U.S. Appl. No. 14/087,188 Office Action dated Nov. 6, 2014.
U.S. Appl. No. 11/509,915 Amendment dated Dec. 8, 2014.
U.S. Appl. No. 11/509,915 Office Action dated Feb. 26, 2015.
U.S. Appl. No. 14/087,188 Pre-Appeal Conference Request dated May 6, 2015.
U.S. Appl. No. 14/837,900 Office Action dated Jan. 25, 2016.
U.S. Appl. No. 14/837,900 Amendment dated Apr. 21, 2016.
U.S. Appl. No. 14/837,900 Office Action dated Jun. 8, 2016.
U.S. Appl. No. 15/163,285 Office Action dated Nov. 21, 2016.
U.S. Appl. No. 14/837,900 Notice of Appeal dated Dec. 8, 2016.
U.S. Appl. No. 15/163,285 Amendment dated Mar. 21, 2017.
U.S. Appl. No. 15/163,285 Office Action dated May 9, 2017.
U.S. Appl. No. 15/163,285 Amendment dated Feb. 9, 2018.
U.S. Appl. No. 15/163,285 Office Action dated May 15, 2018.
U.S. Appl. No. 15/163,285 Amendment dated Aug. 15, 2018.
U.S. Appl. No. 15/163,285 Office Action dated Oct. 19, 2018.
U.S. Appl. No. 15/163,285 Notice of Appeal dated Jan. 22, 2019.
U.S. Appl. No. 15/163,285 Appeal Brief dated Jun. 20, 2019.
U.S. Appl. No. 15/163,285 Examiners Answer dated Aug. 14, 2019.
U.S. Appl. No. 15/163,285 Reply Brief dated Oct. 14, 2019.
U.S. Appl. No. 15/992,033 Office Action dated Jan. 24, 2020.
U.S. Appl. No. 16/011,579 Office Action dated Feb. 14, 2020.
PCT/US2018/034954 PCT International Search Report and Written Opinion dated Jul. 12, 2018.
PCT/US2018/038126 PCT International Search Report and Written Opinion dated Aug. 24, 2018.
PCT/US2018/034954 Chapter II Demand and Response to Written Opinion dated Mar. 26, 2019.
PCT/US2018/034954 Second Written Opinion dated Apr. 30, 2019.
EP18731331.7 Response and amendment dated Jul. 24, 2020.
Abel, et al., "Preparation and Investigation of Antibacterial Carbohydrate-Based Surfaces", Carbohydrate Research, vol. 337, No. 24; pp. 2495-2499; Nov. 29, 2002.
Allison, et al., "Hemocompatibility of Hydrophilic Antimicrobial Copolymers of Alkylated 4-Vinylpyridine" Biomacromolecules; 2007, 8; pp. 2995-2999.
Borman, "Surfaces Designed to Kill Bacteria", Chemical & Engineering News; vol. 80, No. 22; pp. 36-38; Jun. 10, 2002.
Docherty, K., et al., "Toxicity and Antimicrobial Activity of Imidazolium and Pyridinium Ionic Liquids", Green Chemistry, vol. 7, pp. 185-189, Mar. 14, 2005, DOI: 10.1039/b419172b.
Kawabata, et al., "Antibacterial Activity of Soluble Pyridinium-Type Polymers", Applied and Environmental Microbiology; vol. 54, No. 10; pp. 2532-2535; Oct. 1988.
Krishnan, et al., "Antibacterial Coatings Based on Quaternized Poly(4-Vinylpyridine) Block Copolymers", Polymeric Materials: Science and Engineering; vol. 91; pp. 814-815; 2004.
Kugler, R., et al., "Evidence of a Charge-Density Threshold for Optimum Efficiency of Biocidal Cationic Surfaces", Microbiology, 151, 2005, pp. 1341-1348, DOI: 10.1099/mic.0.27526-0.
Li, et al., "Bactericidal Ability of a Soluble Pyridinium-Type Polymer Under Different Conditions"; pp. 177-178; National American Chemical Society Meeting, Anaheim, CA; Mar. 21-25, 1999.
Li, et al., "Effect of the Macromolecular Chain Structure of a Soluble Pyridinium-Type Polymer on Antimicrobial Activity"; pp. 175-176; National American Chemical Society Meeting, Anaheim, CA; Mar. 21-25, 1999.
Lin, et al., "Insights Into Bactericidal Action of Surface-Attached Poly(vinyl-N-hexylpyridinium) Chains", Biotechnology Letters, vol. 24, No. 10; pp. 801-805; May 2002.
Lin, et al., "Mechanism of Bactericidal and Fungicidal Activities of Textiles Covalently Modified With Alkylated Polyethylenimine", Biotech. Bioeng.; vol. 83, No. 2; pp. 168-172; Jul. 20, 2003.
Napper, D.H., "Steric Stabilization", Department of Physical Chemistry, University of Sydney, Journal of Colloid and Interface Science, vol. 58, No. 2, Feb. 1977, ISSN 0021-9797, pp. 390-407.
Sellenet, et al., "Hydrophilized Pyridinium Bactericidal Polymers", Fall National American Chemical Society Meeting, Washington, DC; Aug. 28-Sep. 1, 2005; pp. 2.
Sellenet, et al., "Synergistic Activity of Hydrophilic Modification in Antibiotic Polymers" Biomacromolecules; 2007, vol. 8, No. 1; pp. 19-23.
Sellenet, "Hydrophilized Bactericidal Polymers", Thesis, Purdue University, MSE, Dec. 2004; pp. 83.
Tadros, Tharwat F., "Emulsion Formation, Stability, and Rheology", pp. 1-75, 2013.
Tiller, et al., "Designing Surfaces That Kill Bacteria on Contact", Proc. Natl. Acad. Sci. USA; vol. 98, No. 11; pp. 5981-5985; May 22, 2001.
Tiller, et al., "Polymer Surfaces Derivatized With Poly(Vinyl-N-Hexylpyridinium) Kill Airborne and Waterborne Bacteria"; Biotechnology and Bioengineering; vol. 79, No. 4; pp. 465-471; Aug. 20, 2002.
Waschinski, C., et al., "poly(oxazoline)s with Telechelic Antimicrobial Functions", Biomacromolecules 2005, vol. 6, No. 1, pp. 235-243.
Wynne, et al., "Novel Polymer Bound Bactericidal Surfaces"; vol. 45, No. 2; pp. 521-522; Fall National American Chemical Society Meeting, Philadelphia, PA; Aug. 22-27, 2004.

(56) References Cited

OTHER PUBLICATIONS

Alternative Medicine Review, Undecylenic Acid Monograph, vol. 7, No. 1, 2002, pp. 68-70.
Selected Abstracts; Dec. 2004—Mar. 2005; pp. 3.
Surface Industry, Detergent Raw Material, Sodium Tripolyphosphate 94.0% (STPP Industrial Grade), pp. 1-2, XP055579364.
XP002783622, Database WPI, Week 199349, Thomson Scientific, London, GB, AN 1993-389137, pp. 4.
U.S. Appl. No. 16/993,761 Preliminary amendment dated Nov. 11, 2020.
U.S. Appl. No. 15/163,285 RCE and amendment dated Dec. 10, 2020.
EP18740003.1 Response and amendment dated Oct. 28, 2020.
Oxford Dictionary of Chemistry, 6th Edition, 2008, pp. 134-135 and 203.
"Sodium Dodecylbenzene Sulfonate (SDBS)", USDA Technical Evaluation Report, May 26, 2017, pp. 1-21.
EP18731331.7 OA dated Apr. 11, 2022.
U.S. Appl. No. 17/115,709 Notice of Allowability dated May 19, 2022.
U.S. Appl. No. 15/163,285 Office Action dated Aug. 20, 2021.
U.S. Appl. No. 15/163,285 Notice of Allowance dated Aug. 30, 2021.
U.S. Appl. No. 17/115,709 Office Action dated Jan. 18, 2022.
U.S. Appl. No. 17/115,709 Amendment dated Mar. 30, 2022.
Beta Merriam Webster; Definition of Derivative by Merriam-Webster Dictionary; Dec. 9, 2015; http://beta.merriam-webster.com/dictionary/derivative; 10pp.
Cpolymer, "Polyquaternium-6", CAS No. 26062-79-3, www.cpolymerchem.com, Apr. 10, 2020, pp. 1.
Lubrizol Advanced Materials, Inc., Toxicology & Microbiology Studies, TOX-010, "Carbopol Aqua SF-1 Polymer", Jan. 2000, pp. 1.
Lubrizol Advanced Materials, Inc., Technical Data Sheet, TDS-294, "Carbopol Aqua SF-1 Polymer", Acrylates Copolymer, Feb. 7, 2013, pp. 9.
PubChem, "Polyquaternium-10", C25H50ClNO16, https://pubchem.ncbi.nlm.nih.gov/compound/Polyquaternium-10, Jan. 9, 2022, pp. 17.
PubChem, "Polyquaternium-6", https://pubchem.ncbi.nlm.nih.gov/#query="Polyquaternium 6", Jan. 9, 2022, pp. 2.
PubChem, "Methacrylamidopropyltrimethylammonium Chloride", C10H21ClN2O, pp. 1.
PolyCare133, UPI Chem, item No. 460034, CAS No. 68039-13-4, www.upichem.com, pp. 1.
Solvay, PolyCare133, Ross Organic an Azelis Company, pp. 1.

\* cited by examiner

DISPERSIBLE ANTIMICROBIAL COMPLEX AND COATINGS THEREFROM

CROSS REFERENCE TO RELATED APPLICATIONS

This application is a Continuation of U.S. application Ser. No. 15/992,033, filed May 29, 2018, and entitled "Dispersible Antimicrobial Complex and Coatings Therefrom," and claims the benefit of priority to U.S. Provisional Patent Application No. 62/511,975, filed May 27, 2017, and entitled "Dispersible Polymeric Antimicrobial," the entire contents of each of which are incorporated by reference herein as if put forth in full below.

FIELD OF THE INVENTION

The invention relates to antimicrobial compounds containing cationic quaternary nitrogen that are compatible with surfactant stabilized suspensions and colloids including emulsion and latex formulations.

BACKGROUND

Various dispersants and surfactants have been developed so that small non-polar particles can be evenly dispersed within an aqueous or aqueous organic carrier. These small particles can be organic or inorganic in nature. Organic particles may include, but are not limited to, small molecule, monomeric, or polymeric entities. The particles may be solid, liquid, or gas. These formulations would include, but are not limited to, dispersions used as binders, adhesives, sealants, or coatings. Inorganic particles may include, but are not limited to, various pigments, thickeners or other materials that give the suspension, emulsion, latex, or colloid their desirable properties.

Dispersants and surfactants frequently consist of molecules having a polar hydrophilic head and a non-polar hydrophobic tail and are referred to as amphiphilic. Their mode of action involves the association of the hydrophobic tail with the non-polar material to be dispersed leaving the polar head on the surface to interact with the polar solvent phase. The exposed polar groups repel each other in those cases where the groups are charged thus preventing the agglomeration of the stabilized particles. The dispersed nonpolar particles are suspended in the polar aqueous medium as individual entities. The polar heads of the surfactant and dispersant molecules are frequently functional groups bearing a negative charge although positive and non-charged species are also possible.

The absence or removal of surfactants or dispersants from the colloid will frequently result in the association or agglomeration of the suspended non-polar particles. The resulting aggregation of particles will destabilize the colloid resulting in a non-homogeneous suspension of limited utility.

One example of a water-based surfactant stabilized dispersion could be a composition containing latex binders as well as mineral based pigments and other additives forming a coating that is applied to a surface for example, a water-based emulsion or latex paint. The composition allows one to apply a homogeneously dispersed matrix of particles and their binder evenly on a surface. Allowing the volatile components to evaporate forms a permanent coating of the dispersed particles and other components present within the binder system.

There is a desire to add antimicrobial characteristics to suspensions, emulsions, latexes, and colloids that are stabilized by normally available surfactants and dispersants. Unfortunately, the most commonly available antimicrobials (quaternary ammonium, phosphonium, and other cationic materials) are frequently not compatible with these surfactants and dispersants. The addition of these cationic species destabilizes the suspensions by combining with the frequently used anionic head groups of the surfactants. The association of the cationic portion of the antimicrobial with the anionic head of the surfactant along with the association of the lipophilic portion of each species results in the formation of insoluble complexes of the antimicrobial and surfactant. These complexes are no longer capable of stabilizing the suspension as they are effectively made unavailable, and the dispersed elements begin to agglomerate, flocculate or coalesce.

In one instance quaternary ammonium based antimicrobials have reportedly been successfully formulated into latex paints, however, this requires careful selection of components and their relative concentrations in order to minimize the instability of the suspension. See, e.g., U.S. Pat. No. 9,131,683.

In addition, it is particularly difficult to disperse particles of various hydrophobic small molecules and polymers in water. The hydrophobicity of the organic compounds causes the particles to rapidly separate from water and concentrate in the bottom of a container holding the particle-containing aqueous suspension. The polymeric particles have a much greater affinity for one another than water and often agglomerate together in the bottom of the container. It can be quite difficult to re-disperse these polymeric particles that have settled within the container as a consequence of clumping. The non-homogeneity of the resulting suspension results in a non-homogeneous application and final coating.

This non-suspendability is also particularly true for many antimicrobial small molecules and polymers that are hydrophobic. In particular, the relatively high molecular weight of the polymer present within the particles allows the polymer chains to intertwine, known as pseudo cross-linking. The particles' relatively large size provides for large hydrophobic domains of substantial surface area to come in contact with one another when the particles settle from the aqueous carrier. The large areas of hydrophobic polymer in contact with one another can provide a strong binding force between particles. It can therefore be quite difficult to form a stable dispersion of these antimicrobial polymers in an aqueous carrier to form e.g. a water-based paint that is antimicrobial.

BRIEF SUMMARY OF ASPECTS OF THE INVENTION

Among other embodiments, the invention provides cationic antimicrobial complexes that are dispersible in an aqueous carrier. The invention also provides in some embodiments an amphiphilic antimicrobial material that is compatible with surfactants and dispersants commonly used to make suspensions, latexes, and colloids. The invention also provides methods of making such particles as well as methods of dispersing surfactant compatible antimicrobial particles.

A number of compositions are disclosed herein. One such composition may comprise a mixture of a carrier liquid and at least first and second complexes. The first complex is a cationic antimicrobial compound complexed with an anionic surfactant. The second complex differs from the first one. The anionic surfactant of the second complex may be the same as or may differ from the surfactant of the first complex, and the second complex may be in the form of particles (solid and/or immiscible droplets) in the carrier liquid. The mixture may be in the form of a suspension and/or a colloid, such as a latex and/or an emulsion.

Another composition comprises a mixture of a carrier liquid and at least one complex. This complex has a cationic antimicrobial polymeric portion and an anionic surfactant-compatibilizing portion, and the complex has an ionic attraction between the cationic antimicrobial portion and the anionic surfactant-compatibilizing portion that is greater than an ionic attraction of either portion to any other ions present in the liquid carrier. Preferably, the complex after removal of the liquid carrier has sufficient antimicrobial activity to substantially reduce the presence of bacteria. Also preferably, the anionic surfactant-compatibilizing portion suspends the complex in the carrier liquid. Further, the mixture without addition of the complex is a suspension and/or a colloid, such as a latex and/or an emulsion. Additionally, the mixture after addition of the complex remains a suspension and/or a colloid, such as a latex and/or an emulsion.

A composition as disclosed herein may comprise a liquid carrier and a dispersion of antimicrobial complex having a plurality of molecules of a cationic antimicrobial portion of the complex in a carrier liquid containing a dispersion. The cationic antimicrobial portion in the carrier liquid is complexed to a first anionic surfactant-compatibilizing portion derived from a first anionic surfactant. The dispersion also has a second anionic surfactant, and the first anionic surfactant-compatibilizing portion has an ionic attraction to the cationic antimicrobial portion that is greater in magnitude than an ionic attraction of the second anionic surfactant to the cationic antimicrobial portion. Preferably, the first anionic surfactant-compatibilizing portion has an ionic attraction to the cationic antimicrobial portion that is greater than the ionic attraction of any anion in the carrier liquid to the cationic antimicrobial portion.

Any composition as described herein may preferably be formulated as an antimicrobial liquid coating composition, which may remain as a liquid when applied or may cure to form a solid coating on an object. One such coating composition may comprise a mixture containing a complex having a cationic antimicrobial portion and a first anionic surfactant-compatibilizing portion. The mixture may be a stable suspension and/or a colloid, such as a latex and/or an emulsion. This mixture contains more total surfactant (of the same or of a different type of surfactant) than a comparative suspension and/or colloid that is unstable in the absence of the first anionic surfactant-compatibilizing portion.

The invention also provides various methods of making a mixture. In one embodiment, the invention provides a method of making a coating material in which one disperses a complex as described herein in a carrier liquid that contains a second anionic surfactant. The first anionic surfactant-compatibilizing portion of the complex has an affinity for the cationic antimicrobial portion of the complex that is greater than or equal to the affinity of the second anionic surfactant to the cationic antimicrobial portion.

Another method of making a mixture comprises forming a first mixture comprising a dispersion and/or colloid, such as a latex and/or an emulsion, with a dispersible antimicrobial complex as disclosed herein to form a second mixture. The dispersible antimicrobial complex may be added to the first mixture as a complex, or the complex may be formed in the first mixture by adding an anionic surfactant and a cationic antimicrobial compound to the first mixture and mixing to form the dispersible antimicrobial complexes in the first mixture.

The invention also provides various methods of using a first anionic surfactant. One such method prevents precipitation of cationic antimicrobial compound and/or destabilization of a suspension and/or a colloid, such as a latex and/or an emulsion. The method involves (a) adding a cationic antimicrobial compound to a mixture that includes a second anionic surfactant, wherein the cationic antimicrobial compound destabilizes a disperse phase in the mixture in the absence of addition of the first anionic surfactant and the mixture is a latex, a suspension, or a colloid; and (b) preventing the precipitation and/or destabilization by adding the first anionic surfactant to the mixture to prevent the cationic antimicrobial compound from destabilizing the disperse phase in the mixture. The cationic antimicrobial compound and first anionic surfactant may be added to the mixture separately or as a pre-formed complex.

Other compositions, methods of making, and methods of using the new complexes disclosed herein are disclosed below.

DETAILED DESCRIPTION OF THE INVENTION

The invention in one instance provides dispersible antimicrobial complexes that can be dispersed and preferably suspended in either (a) an organic carrier such as oil or a dispersion in oil or (b) an aqueous carrier such as water, a water-based solution, or an aqueous dispersion. A dispersion may have liquid or solid particles and can be in such forms as a suspension and/or a colloid such as a latex or an emulsion. The particles of dispersible antimicrobial complexes can be e.g. part of a solution or dispersion that can be applied to a surface to form a coating.

Dispersible antimicrobial complexes may have two portions, a cationic antimicrobial portion and an anionic surfactant-compatibilizing portion. These two portions complex together, with the ionic attraction of the two portions typically being greater than the attraction to other ions present in the solution (and preferably their ionic attraction being greater than the attraction to any other ions present in the solution). The ionic attraction of the two portions may also be such that the ionic strength contributed by the complex to the entire solution is relatively low—i.e. the concentration of either ion of the dispersible polymeric antimicrobial particles in the carrier liquid is low but sufficient to substantially reduce the presence of bacteria without destabilizing the suspension or colloid (in latex or emulsion form). The anionic surfactant-compatibilizing portion is preferably sufficiently hydrophilic to enable the entrainment of dispersible polymeric antimicrobial particles in water to form a colloid (latex or emulsion) or sufficiently hydrophobic to enable the entrainment in an organic liquid to form a colloid, as discussed further below.

A dispersible antimicrobial complex may be present in its carrier liquid as e.g. an individual molecule or as a liquid or solid particle. These particles may be on the order of e.g. several nanometers to several microns in size, for instance.

The molar ratio of cationic antimicrobial portion to anionic surfactant-compatibilizing portion may be e.g. about 1:1 to 1:1.2. A slight excess of surfactant can help to retain complexes in suspension in their carrier liquid, particularly if the cationic antimicrobial portion is polymeric. However, an excess may cause destabilization of other colloids or suspensions present in the carrier liquid. Consequently, one should adjust the amount of anionic surfactant-compatibilizing portion accordingly.

Cationic Antimicrobial Portion

The cationic antimicrobial portion is an ionic form of a cationic antimicrobial compound that has an anion (e.g. a halide such as Cl– or Br–) associated with it. The cationic antimicrobial compound may be a small molecule whose chemical formula is not represented by repeated monomers or comonomers, an oligomer of e.g. 2-4 monomers or comonomers that have been copolymerized to form the oligomer, or a polymer having >4 monomers or comonomers that have been copolymerized to form the polymer, for instance. The cationic antimicrobial compound as used in the invention may also be a mixture of these compounds.

The cationic antimicrobial compound may be more easily dissolved or suspended in its carrier liquid when complexed with its corresponding anionic surfactant. For instance, a cationic polymeric antimicrobial compound may be a homopolymer of e.g. 4-vinylpyridine that has been quaternized with e.g. 1-bromohexane or 1-chlorohexane. Corresponding anionic surfactants as discussed below can aid in dissolving or dispersing this hydrophobic antimicrobial compound in an aqueous carrier.

The cationic antimicrobial compound may be one that is antimicrobial due to a quaternized nitrogen and/or phosphorous being present in the compound. These compounds can exhibit very good antimicrobial behavior, and in limited circumstances as discussed below, may be biocompatible. The nitrogen or phosphorous of the cationic antimicrobial compound may be quaternized with hydrogen or with an alkyl, for instance. Preferably the alkyl is a linear alkyl having between 4 and 12 carbon atoms, with 4 and 6 carbon atoms being preferred. Such alkyl groups may be used in other of the antimicrobial compounds as well.

Polymeric cationic antimicrobial compounds are preferred when forming a complex of the invention. The complexes formed using polymeric cationic antimicrobial compounds are typically particles as dispersed in their carrier liquid. These compounds can have properties similar to properties of other particles in the carrier liquid, and polymeric compounds also typically have high antimicrobial activity because of the large number of cationic active sites that can be incorporated into the polymeric compounds.

The cationic antimicrobial portion may be a polymeric cation that possesses nonionic polar portions but in a number insufficient to enable the cationic polymeric antimicrobial portion to remain dispersed in an aqueous carrier. The anionic surfactant-compatibilizing portion will be present to increase the overall polarity of the polymer through formation of a complex of increased solubility but in dynamic equilibrium with an aqueous carrier such that sufficient antimicrobial is present in a suspension or colloid to be effective but not destabilize the suspension or colloid. The anionic surfactant used may contain a large number of nonionic polar groups to aid in forming the suspension or colloid.

Optionally the cationic polymeric antimicrobial portion may be hydrophilic and partially or completely soluble in aqueous media. The hydrophilicity of the cationic polymeric antimicrobial portion can complement the hydrophilicity of the anionic surfactant portion to aid in maintaining the complex as part of a colloidal suspension. The hydrophilicity introduced by way of a hydrophilic comonomer can also aid in maintaining the cationic polymeric antimicrobial portion in solution in an effective amount to maintain the solution as antimicrobial. A discrete hydrophilic domain can be formed in the cationic polymeric antimicrobial portion by copolymerizing antimicrobial monomers with hydrophilic monomers in a random or block polymerization reaction. Some particularly useful hydrophilic monomers are HEMA, PEGMA, and PEGMEMA, for instance.

A hydrophilic cationic antimicrobial portion may also provide a larger set of surfactants that can be used to form complexes. Some surfactants are not sufficiently hydrophilic to disperse hydrophobic cationic antimicrobial portions in the carrier liquid. However, the combined hydrophilicity of the cationic antimicrobial portion and the surfactant may together be sufficient to disperse them in the carrier liquid without precipitation and while maintaining antimicrobial efficacy.

An example of a cationic antimicrobial compound containing a hydrophilic comonomer would be a random or block copolymer of a hydrophobic vinyl pyridine such as 4-vinylpyridine and a hydrophilic monomer e.g. (2-hydroxyethyl) methacrylate, poly(ethylene glycol) methacrylate, and/or poly(ethylene glycol) methyl ether methacrylate, that has been quaternized with e.g. an alkyl halide having e.g. between 4 and 12 carbon atoms (preferably a linear alkyl) such as butyl bromide as is disclosed in e.g. U.S. Pat. No. 8,343,473 issued Jan. 1, 2013 entitled "Hydrophilized Antimicrobial Polymers", which is incorporated by reference in its entirety for all that it teaches and for all purposes herein (this patent is therefore to be treated as if this patent is repeated in full below). The anionic surfactant-compatibilizing portion complexed to such a cationic polymeric antimicrobial portion can help to diminish or prevent the cationic polymeric antimicrobial portion from destabilizing other colloidal, dispersed, or dissolved components in the aqueous media as well as help to disperse the complex in the liquid carrier.

A copolymer as described above can help to overcome a common problem incorporating cationic antimicrobial compounds into a colloid such as a latex or an emulsion. The cationic antimicrobial compounds that lack hydrophilicity often quickly precipitate from the coating solution into which the antimicrobial compounds are incorporated, thereby losing antimicrobial efficacy. These cationic antimicrobial compounds lacking hydrophilicity also can destabilize other colloidal particles in e.g. a liquid coating material and render the mixture worthless in a short time. A copolymer of e.g. a cationic antimicrobial monomer and hydrophilic comonomer can help to overcome one or more of these problems.

The cationic polymeric antimicrobial compound of U.S. Pat. No. 8,343,473 may, in some instances, exhibit low toxicity so as to be biocompatible. For instance, the hydrophilic comonomer of a quaternized nitrogen- or phosphorous-containing cationic antimicrobial portion may be a poly(ethylene glycol methacrylate) ("PEGMA"), and in a particular form this PEGMA may be poly(ethylene glycol methyl ether methacrylate) ("PEGMEMA"). A liquid coating material incorporating one or more of the biocompatible cationic polymeric antimicrobial compounds and the resultant dry coating are also biocompatible. Such biocompatible coatings are often preferred for making objects used in hospitals and households.

Other examples of cationic antimicrobial portions are e.g. N-alkyl-N,N-dimethyl-benzyl ammonium and N,N-dialkyl-N,N-dimethyl ammonium. The cationic antimicrobial portion may be soluble in water, and its compatibility with external surfactants can be increased by virtue of the anionic surfactant-compatibilizing portion that complexes the cation sufficiently to prevent removal of surfactant necessary to disperse antimicrobial compound (e.g. particles) into the aqueous matrix without destabilizing the suspension.

Useful examples of quaternary ammonium compounds include, but are not limited to n-alkyl (C8-C18) dimethyl benzyl ammonium chlorides, benzalkonium chloride (where the alkyl side chain is C8, C10, C12, C14, C16 or C18 or mixtures thereof), n-alkyl (C8-C18) dimethyl ethylbenzyl ammonium chlorides, dialkyl dimethyl ammonium chlorides (where the alkyl side chain is C6-C12), n-alkyl dimethyl benzyl ammonium chloride, and didecyl dimethyl ammonium chloride, octyl decyl dimethyl ammonium chloride, dioctyl dimethyl ammonium chloride, didecyl dimethyl ammonium chloride, and mixtures of same.

The cationic antimicrobial compounds discussed above that form the antimicrobial cationic portion of a complex can be individual molecules or small groups of molecules and, in some instances, may be polymer particles having a particle size on the order of microns or tens of microns. The density of these particles may differ from the density of the liquid in which the particles are suspended, allowing the particles to concentrate and agglomerate over time. The anionic surfactant can aid in suspending these particles as well as help to prevent the cationic antimicrobial compounds from complexing or otherwise interacting with surfactant associated with other particles to destabilize the colloid, suspension, or latex in which the cationic antimicrobial compounds are dispersed.

Anionic Surfactant-Compatibilizing Portion

The anionic surfactant-compatibilizing portion is an anion of an anionic surfactant compound. The anionic surfactant-compatibilizing portion helps to reduce the interaction of the cationic antimicrobial portion with other surfactant used in the liquid mixture into which the complex is introduced. The anionic surfactant-compatibilizing portion also helps to maintain the equilibrium concentration of all anionic stabilizers in solution, including the anionic surfactant-compatibilizing portion. Consequently, the cationic antimicrobial portion is less prone to destabilizing any disperse phase in the liquid mixture containing the cationic antimicrobial portion.

The anionic surfactant-compatibilizing portion typically has a hydrophobic part and a hydrophilic part. The hydrophobic part generally associates with the cationic antimicrobial portion, and the hydrophilic part associates with an aqueous carrier liquid or with a disperse water phase in an organic carrier liquid. The hydrophobic part may be aromatic or olefinic, for instance, and preferably the hydrophobic part has at least 6 carbon atoms and more preferably at least 8 carbon atoms. When aromatic, the aromatic part (e.g. a benzyl group) may have a hydrophobic substituent such as an alkyl (linear or branched) having between 1 and 12 carbon atoms, and more preferably having at least 6 carbon atoms.

The particular anionic surfactant-compatibilizing portion may be selected based on other surfactants present and the effect of introducing the anionic surfactant-compatibilizing portion on other dispersed materials in the carrier liquid. The anionic surfactant-compatibilizing portion may be identical to other surfactant present in the carrier liquid and used to help disperse other compounds within the carrier liquid to help minimize destabilization of other dispersions. Otherwise, the anionic surfactant-compatibilizing portion may have the same anions and similar non-polar domains as are found in other anionic surfactants to help prevent destabilization. Alternatively, the anionic surfactant-compatibilizing portion may have an anion whose pKa and molecular weight are similar to pKa and molecular weight of other anionic surfactants in the carrier liquid.

The overall polarity of the antimicrobial cationic portion is typically reduced when a complex is formed. The solubility of the dispersible antimicrobial complex may also be reduced as a consequence, but the dispersible antimicrobial complex may remain in dynamic equilibrium with the liquid of the liquid mixture (e.g. a latex, suspension, or colloid) such that sufficient cationic antimicrobial compound is present in the liquid mixture due to the presence of the anionic surfactant to be effective but not destabilize the liquid mixture.

The anionic surfactant-compatibilizing portion may have a polar portion or portions in addition to the anionic center that binds the anionic surfactant-compatibilizing portion to the cationic polymeric antimicrobial portion. The anionic surfactant-compatibilizing portion may have one or more electronegative and/or electropositive atoms in the anionic surfactant-compatibilizing portion to aid in dispersing the polymeric antimicrobial particles within the coating composition. The anion itself may provide sufficient hydrogen bonding to disperse the polymeric antimicrobial particles. Alternatively, the anionic surfactant-compatibilizing portion may not have sufficient hydrophilicity alone to suspend particles unless those particles also contain hydrophilic groups as discussed above.

The anionic surfactant-compatibilizing portion does not interfere substantially with antimicrobial activity of the cationic polymeric antimicrobial portion present in solution. The anionic surfactant-compatibilizing portion may itself be a surfactant that is capable of stabilizing the disperse phase, enabling the exchange of stabilizers between the disperse phase and the cationic antimicrobial compound without affecting the stability of the suspension. This may be particularly true where the anionic surfactant-compatibilizing portion is the same surfactant used to stabilize other components present in the carrier liquid with the dispersible antimicrobial complex.

The anionic surfactant-compatibilizing portion may also be antimicrobial in its own right, thus adding potentially broader scope of efficacy. Examples of such compatibilizers include but are not limited to fatty acids, e.g. lauric acid, octadecenoic acid, octadeca-dienoic acid; sulfonic acids and amides, e.g. 4-dodecylbenzenesulfonate and/or saccharinate.

The anionic surfactant-compatibilizing portion can be any one or more of the following or its salt, for instance:

a. Phosphonates such as hexylphosphonate, dodecylphosphonate, octadecylphosphonate and their mono methyl esters or similar aliphatic, aromatic or heterocyclic mono esters.

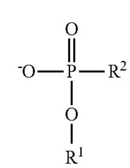

Where $R^1$=H, linear or branched chain alkyl groups or mixtures of groups having 1-7 carbons and $R^2$=linear or branched chain alkyl groups or mixture of groups having 6-20 carbons, benzyl or C1-C18 alkyl benzyl groups b. Sulfonates such as e.g. toluenesulfonate, benzenesulfonate, dodecylbenzenesulfonate

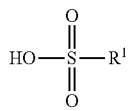

Where $R^1$=linear or branched chain alkyl groups or mixture of groups having 6-20 carbons, benzyl or C1-C18 alkyl benzyl groups. $R^1$ groups may also contain halogen such as fluoride, chloride, bromide, or iodide as well as one or more hetero atoms such as nitrogen, oxygen, phosphorus, or sulfur c. Sulfate Monoesters such as lauryl sulfate, sodium lauryl sulfate, dodecyl sulfate, sodium dodecyl sulfate

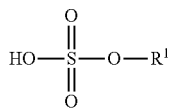

Where $R^1$=linear or branched chain alkyl groups or mixture of groups having 6-20 carbons, benzyl or C1-C18 alkyl benzyl groups. $R^1$ groups may also contain halogen such as fluoride, chloride, bromide, or iodide as well as one or more hetero atoms such as nitrogen, oxygen, phosphorus, or sulfur.

d. Benzoate such as benzoic acid, sodium benzoate, alkyl benzoic acid

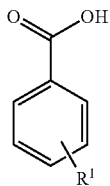

Where $R^1$ may be placed at the 2, 3, or 4 position in the case of monosubstituted rings and in the 2, 3, 4, 5, or 6 position in disubstituted or higher rings. $R^1$ may be saturated or unsaturated, linear or branched chain, cyclic alkyl groups or mixture of groups having 6-20 carbons, benzyl or alkyl substituted benzyl group $R^1$ groups may also contain halogen such as fluoride, chloride, bromide, or iodide as well as one or more hetero atoms such as nitrogen, oxygen, phosphorus, or sulfur.

e. Carboxylates such as stearic acid, palmitic acid, myristic acid, undecanoic acid, undecenoic acid.

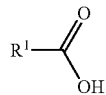

$R^1$ may be saturated or unsaturated, linear or branched chain, a cyclic alkyl group or mixture of groups having 6-20 carbons each or, benzyl or alkyl substituted benzyl groups. $R^1$ groups may also contain halogen such as fluoride, chloride, bromide, or iodide as well as one or more hetero atoms such as nitrogen, oxygen, phosphorus, or sulfur.

f. Glycolic moiety such as glycolic acid and other longer chain alpha-hydroxy acids

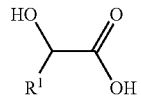

$R^1$ may be saturated or unsaturated, linear or branched chain, a cyclic alkyl group or mixture of groups having 6-20 carbons each or, benzyl or alkyl substituted benzyl groups. $R^1$ groups may also contain halogen such as fluoride, chloride, bromide, or iodide as well as one or more hetero atoms such as nitrogen, oxygen, phosphorus, or sulfur.

g. In general other anionic species of sufficiently high polarity to aid in dispersing the antimicrobial particles.

Making Complex of Cationic Antimicrobial Compound and Anionic Surfactant

The anionic surfactant to be complexed with the cationic antimicrobial can be selected from a list of common soaps and detergents. The anionic surfactant used in a particular mixture preferably has equivalent or greater ionic attraction for the cationic antimicrobial compound added to the liquid mixture than all other anions that are present in the mixture and that contribute to stability of the disperse phase in the mixture. Ideally the anionic surfactant should be similar or identical to that used to produce the colloid to be treated. The surfactant can be compounds bearing a sulfate, sulfonate, phosphate ester, or carboxylate of the type mentioned earlier.

The complex may be formed and subsequently added into a mixture that is to contain the complex. For instance, a first solution of dispersible antimicrobial complex or particles may be formed using a cationic quaternized antimicrobial compound in the form of a small molecule and bearing an exchangeable counterion such as a halogen anion. A second solution of surfactant containing an anionic form (e.g. salt such as a group I-ion salt) of a surfactant type listed above may be rapidly mixed with the first solution to form the complex. This complexing reaction can proceed in e.g. solution in a polar solvent such as isopropyl alcohol, ethanol, methanol, acetone, or water. The reaction preferably proceeds at a pH of about neutral. The pH is preferably between e.g. 2.0 and 9.0, more preferably between 5.5 and 6.5. The complex can then be concentrated or isolated from its solution and added to a solution or liquid mixture containing a disperse phase. Often, the small-molecule complex can precipitate, and the precipitate can be isolated and washed prior to incorporating it into a carrier liquid.

A polymeric dispersible antimicrobial complex can be formed similarly. For instance, cationic antimicrobial compound in powdered form may be dissolved rapidly in a solution containing excess surfactant under conditions as discussed above, and the resultant solution can be used as-is with other stabilizers in solution or can be treated using methods known to those in the field to isolate complexes from excess surfactant.

The antimicrobial complexes are easily dispersed. Dispersion of the antimicrobial complexes can be accomplished using techniques commonly used in the preparation of coatings such as high shear mixers or media mill.

The complex may also or instead be formed in a solution or liquid mixture having a disperse phase without destabilizing the solution or mixture. For instance, anionic surfactant and cationic antimicrobial compound may be added to a solution or mixture having a disperse phase simultaneously using good agitation to blend the components, thereby rapidly forming a complex of the cationic antimicrobial and anionic surfactant in the mixture while preserving any disperse present in the original mixture. In some instances, the anionic surfactant flow may precede simultaneous addition of anionic surfactant and cationic antimicrobial compound as long as the flow and/or amount of surfactant added does not destabilize the disperse phase or cause precipitation. Alternatively, small quantities of each may be added alternately (e.g. a small quantity of anionic surfactant followed by a small quantity of cationic antimicrobial compound) to avoid destroying the original dispersion present in the mixture or to avoid precipitating a desirable ion or compound to be retained in the solution. If needed, additional compounds or buffers may be added to maintain pH of the mixture to avoid destabilizing it and precipitating materials that should remain in suspension or solution. One can employ the techniques used in preparing coatings when preparing solutions or mixtures of the invention.

A coating material also typically contains a surfactant that stabilizes coating particles dispersed in the coating solution. A new coating material can therefore be formed by adding a dispersible antimicrobial complex as disclosed herein to the pre-existing coating material that contains the surfactant stabilizing coating particles. In this case, the affinity of the cationic antimicrobial portion of the complex for the anionic surfactant-compatibilizing portion is greater than or equal to its affinity to the surfactant that stabilizes the coating particles.

The above-described methods of forming dispersible polymeric antimicrobial particles can therefore involve the combination of a biocompatible antimicrobial cation with an anion which forms a complex with the cation. The anion which in this case is sufficiently polar to disperse the particles in the aqueous carrier, particularly where particles have low solubility in water.

The antimicrobial-surfactant complexes may organize into micelles and/or associate loosely or not at all in the mixture while remaining disperse in the aqueous mixture. If micelles form, the cationic antimicrobial portions of the complexes reside at exposed surfaces of the micelles when complexed to surfactant. The cationic antimicrobial portions are therefore available to inactivate microbes in their liquid mixture or in a dried or cured coating formed from the mixture.

Dispersion stability was demonstrated, in one instance, by the addition of 1.0 gram of a random copolymer having 10 mol % poly(ethylene glycol) methyl ether methacrylate and 90 mol % N-hexyl-4-vinyl pyridinium stearate to 30 grams of white latex paint and 30 grams of distilled type II water, and the sample was visually observed over a period of 21 days. There was little or no evidence of excess separation of the dispersion during this period when compared to a similarly prepared control suspension.

The coating composition may be e.g. a paint formulation containing, in addition to the dispersible antimicrobial polymer, any one or more of the following components:
  a. Pigment and/or dye such as $TiO_2$, calcium carbonate, talc, clay, silicates, aluminum silicates, calcium metasilicates, aluminum potassium silicates, magnesium silicates, barium sulfates, nepheline syenite, feldspar, zinc oxides or sulfides, functional fillers such as intumescent ingredients, such as ammonium polyphosphates, melamines, pentaerythritol and similar compounds.
  b. Surfactants such as cetylpyridinium bromide, benzalkonium chloride, stearic acid, alkyl ether phosphates, polyoxyethylene glycol ethers, sodium lauryl sulfate, dodecylbenzene sulfonate.
  c. Thickeners such as urethane thickeners and acrylic thickeners
  d. Synthetic organic materials might also be incorporated; these include plastic beads, hollow spheres or other similar materials. Other optional components include glycols such as ethylene and/or propylene glycol in amounts up to about 7% and other solvents such as diethylene glycol dibenzoate and dipropylene glycol dibenzoate in amounts up to about 3%. The coating composition may also contain pigment dispersing agents which can be solvents or surfactants; wet paint preservatives; dry film preservatives; foam control agents such as oils, fatty acids and silicones; slip and mar additives; adhesion promoters, and/or other known paint additives.
  e. The paint composition of the present invention may also comprise other biocides including but not limited to metal ion containing compounds, polymeric biocides, heterocyclic compounds, phenols, organometallics, aldehydes, proteins, peroxygens, alcohols, enzymes, polypeptides, and halogen releasing compounds.

The coating solution may preferably have a pH of about neutral pH. The pH is preferably between e.g. 2.0 and 9.0, more preferably between 5.5 and 6.5.

Other coating solutions into which the dispersible polymeric antimicrobial particles may be incorporated include inks, floor waxes, and furniture polishes.

An ink formulation typically has organic and/or inorganic pigment particles dispersed in a continuous aqueous, aqueous-organic, or organic phase, along with such other components as resins, surfactants, fillers, preservatives, and/or wetting agents. An example of such an ink formulation is one that has acrylic polymers, aliphatic polyurethane, and aliphatic polyester polyurethane resins as stabilized emulsions or dispersions. The formulation also includes, organic solvents, pigments, as well as photo-initiators as disclosed in U.S. Pat. Appl. No. 2012/0046378 A1, which application is incorporated by reference in its entirety.

Floor wax is typically a dispersion of a polymer that imparts the floor wax's finish, a polymer binder, and various coalescents and plasticizers and other components in an aqueous continuous phase. An example of such a floor wax is one that has styrene-ethyl acrylate-methyl methacrylate copolymer emulsion, polyethylene emulsion, tricresyl phosphate plasticizer, and styrene-maleic copolymer as disclosed in e.g. U.S. Pat. No. 3,328,328, which patent is incorporated by reference in its entirety.

A furniture polish may contain one or more of the following hydrophobic materials dispersed in an aqueous phase: carnauba wax, candelilla wax, sugar cane wax, cotton wax, beeswax, shellac, lanolin fractions from sheep, ozokerite, paraffin waxes, microcrystalline waxes, oxidized microcrystalline waxes, Fischer-Tropsch waxes, montan waxes, polymers such as methyl acrylate, ethyl acrylate, butyl acrylate, vinyl acetate, styrene, vinyl chloride, acrylonitrile, and oils such as those derived from vegetable, petroleum, or silicone sources to enhance shine. An example of such a furniture polish is one that has a silicone fluid, polydimethylsiloxanediol, a phosphonic acid dispersant, an oil in water surfactant, and water as disclosed in U.S. Pat. Appl. No. 2013/0109794 A1, which application is incorporated by reference in its entirety.

Dispersion stability may be measured using e.g. a turbidimeter or nephelometer to gauge whether the dispersion meets a desired specification for a particular composition. Stability may also be measured using the method described below.

The stability of the above described compositions can be compared using a method similar to that described in U.S. Pat. No. 9,131,683 B2 executed as follows:

Untreated Coating Preparation:

Selected commercially available and proprietary coatings were diluted to approximately 25% weight solids with type II distilled water. The diluted coating was agitated to ensure a homogeneous suspension. Enough suspension is made to supply test as well as control samples.

Dispersible Quaternary Ammonium Compound Preparation:

Previously prepared dispersible quaternary ammonium compounds were suspended at a known concentration in type II distilled water. Enough suspension is made to supply test as well as control samples.

Stability Test:

20.0 g of diluted coating was mixed with sufficient diluted quaternary ammonium compound to yield a concentration of approximately 1.0% active quaternary ammonium compound in the 20.0 g coating. The mixture is placed in a graduated plastic 35 mL tube. The mixture is covered and then agitated to ensure homogeneity of the suspension. The suspension is then allowed to sit at room temperature. The suspension is observed over a period of at least one week for any settling of the suspension. Any settling is noted as mL of free liquid vs. the total volume of test suspension added to the tube. These observed settling values are compared to a contemporaneously prepared control sample that is of the same concentration.

The antimicrobial effectiveness can be determined by standard microbiological methods. In this case the method used was JIS Z 2801. The method was used as written without significant modification It should be noted that in order to make any coating formulation, an appropriate dispersant/surfactant system is needed in order to disperse the pigments in the paint formulation. The process for selecting dispersants/surfactants for paint formulations is well known to those of ordinary skill in the paint formulation art. After or during selection of a compatible coating system and quaternary ammonium compound as described herein, one of ordinary skill in the art would be able to select a dispersant/surfactant combination in order to make a desired paint composition.

It is quite surprising that a biocompatible antimicrobial polymer can be configured as a dispersible solid. Typically, antimicrobial compounds have a halide anion that is needed to assure that the compounds remain antimicrobial. We have determined, however, that antimicrobial polymers can in fact be configured to be biocompatible as well as dispersible without sacrificing antimicrobial properties. Consequently, a wide array of coatings as disclosed herein can be formulated using dispersible polymeric antimicrobial particles as disclosed herein.

Further, as discussed previously, the antimicrobial polymer has an affinity for surfactant molecules, particularly the cation that has an affinity for anionic surfactant molecules despite the presence of a halide such as a bromide or chloride at the cationic site of the cationic antimicrobial portion. When the antimicrobial polymer encounters a surfactant molecule and joins to it, the resultant product precipitates and settles. The surfactant molecule loses its ability to function as a surfactant, thus losing the ability to disperse polymer in an aqueous environment. The anionic surfactant-compatibilizing portion of dispersible antimicrobial complexes of the invention is selected in this invention to provide particles with much less affinity for surfactant molecules due to a lower rate of exchange of the antimicrobial polymer's anion with surfactant molecules. The anionic surfactant-compatibilizing portion also modifies the polarity of the particles to a sufficient level that the modified antimicrobial particles are dispersible in the aqueous continuous phase.

Additional Examples

Following are specific examples of the invention to supplement the discussion and examples discussed above. The specific examples discussed herein are not limiting on the scope of the invention and are provided to guide persons skilled in this field in forming complexes and mixtures.

Table 1a provides various examples of polymeric cationic antimicrobial compounds and Table 1b provides various examples of nonpolymeric or small-molecule cationic antimicrobial compounds. Examples of compounds provided in Table 1b are benzyl tris(2-hydroxyethyl) ammonium chloride (#18) and tetrakis-hydroxymethyl phosphonium sulfate (#25). Table 2 provides various examples of anionic surfactant that can be used to form complexes. Tables 3a and 3b have examples of complexes formed using the compounds of Tables 1a, 1b, and 2. Table 4 provides examples of select complexes in different products that are made using mixtures containing the complexes. Other complexes of Tables 3a and 3b can be used in similar mixtures.

Examples from Table 4 were used in efficacy tests. The results of such tests are provided in Table 5 and exhibit excellent antimicrobial activity.

TABLE 1a

Examples of polymeric cationic antimicrobial compounds for use in the invention

| No. | Monomer 1 | Monomer 2 | Quaternizer | Moles Monomer 1 | Moles Monomer 2 |
| --- | --- | --- | --- | --- | --- |
| 1 | 4-VP | HEMA | 1-bromohexane | 0.9 | 0.1 |
| 2 | 4-VP | PEGMEMA 300 | 1-bromohexane | 0.9 | 0.1 |
| 3 | 4-VP | PEGMEMA 1000 | 1-bromohexane | 0.9 | 0.1 |
| 4 | 4-VP | PEGMA 300 | 1-bromohexane | 0.9 | 0.1 |
| 5 | 4-VP | PEGMA 1100 | 1-bromohexane | 0.9 | 0.1 |
| 6 | 4-VP | HEA | 1-bromohexane | 0.9 | 0.1 |
| 7 | 4-VP | HEMA | 1-bromohexane | 0.6 | 0.4 |
| 8 | 4-VP | PEGMEMA 300 | 1-bromohexane | 0.6 | 0.4 |
| 9 | 4-VP | PEGMEMA 1000 | 1-bromohexane | 0.6 | 0.4 |

TABLE 1a-continued

Examples of polymeric cationic antimicrobial compounds for use in the invention

| No. | Monomer 1 | Monomer 2 | Quaternizer | Moles Monomer 1 | Moles Monomer 2 |
|---|---|---|---|---|---|
| 10 | 4-VP | PEGMA 300 | 1-bromohexane | 0.6 | 0.4 |
| 11 | 4-VP | PEGMA 1100 | 1-bromohexane | 0.6 | 0.4 |
| 12 | 4-VP | HEA | 1-bromohexane | 0.6 | 0.4 |
| 13 | 4-VP | HEMA | 1-bromohexane | 0.3 | 0.7 |
| 14 | 4-VP | PEGMEMA 300 | 1-bromohexane | 0.3 | 0.7 |
| 15 | 4-VP | PEGMEMA 1000 | 1-bromohexane | 0.3 | 0.7 |
| 16 | 4-VP | PEGMA 300 | 1-bromohexane | 0.3 | 0.7 |
| 17 | 4-VP | PEGMA 1100 | 1-bromohexane | 0.3 | 0.7 |
| 18 | 4-VP | HEA | 1-bromohexane | 0.3 | 0.7 |
| 19 | N,N-DMAA | HEA | Hexyl Tosylate | 0.9 | 0.1 |
| 20 | 4-VP | HEMA | 1-Chlorohexane | 0.9 | 0.1 |
| 21 | 4-VP | PEGMEMA 300 | 1-Chlorohexane | 0.9 | 0.1 |
| 22 | 4-VP | PEGMEMA 1000 | 1-Chlorohexane | 0.9 | 0.1 |
| 23 | 4-VP | PEGMA 300 | 1-Chlorohexane | 0.9 | 0.1 |
| 24 | 4-VP | PEGMA 1100 | 1-Chlorohexane | 0.9 | 0.1 |
| 25 | 4-VP | HEA | 1-Chlorohexane | 0.9 | 0.1 |
| 26 | 4-VP | HEMA | 1-Chlorohexane | 0.6 | 0.4 |
| 27 | 4-VP | PEGMEMA 300 | 1-Chlorohexane | 0.6 | 0.4 |
| 28 | 4-VP | PEGMEMA 1000 | 1-Chlorohexane | 0.6 | 0.4 |
| 29 | 4-VP | PEGMA 300 | 1-Chlorohexane | 0.6 | 0.4 |
| 30 | 4-VP | PEGMA 1100 | 1-Chlorohexane | 0.6 | 0.4 |
| 31 | 4-VP | HEA | 1-Chlorohexane | 0.6 | 0.4 |
| 32 | 4-VP | HEMA | 1-Chlorohexane | 0.3 | 0.7 |
| 33 | 4-VP | PEGMEMA 300 | 1-Chlorohexane | 0.3 | 0.7 |
| 34 | 4-VP | PEGMEMA 1000 | 1-Chlorohexane | 0.3 | 0.7 |
| 35 | 4-VP | PEGMA 300 | 1-Chlorohexane | 0.3 | 0.7 |
| 36 | 4-VP | PEGMA 1100 | 1-Chlorohexane | 0.3 | 0.7 |
| 37 | 4-VP | HEA | 1-Chlorohexane | 0.3 | 0.7 |
| 38 | Poly(hydroxyethylene(dimethyliminio)ethylene(dimethyliminio)methylene) dichloride | | | | |
| 39 | Poly(oxy-1,2-ethanediyl(dimethylimino)-1,2-ethanediyl(dimethylimino)-1,2-ethanediyl dichloride) | | | | |
| 40 | 2-Propen-1-aminium, N,N-dimethyl-N-2-propenyl-, chloride, homopolymer | | | | |
| 41 | Poly(iminoimidocarbonyliminoimidocarbonyliminohexamethylene) hydrochloride | | | | |
| 42 | Poly(oxy-1,2-ethanediyl),.alpha.,.alpha.'-((((1,2,3,4,4a,9,10,10a-octahydro-1,4a-dimethyl-7-(1-methylethyl)-1-phenanthrenyl)methyl)imino)di-2,1-ethanediyl)bis(.omega.-hydroxy-, (1R-(1-.alpha.,4a.beta.,10a.alpha.))- | | | | |

HEMA: 2-hydroxyethylmethacrylate
PEGMA: poly(ethylene glycol) methacrylate, number indicates the average molecular weight of the monomer
PEGMEMA: poly(ethylene glycol)methyl ether methacrylate, number indicates the average molecular weight of the monomer
HEA: 2-hydroxyethyl acrylate
DMAA: 1,3-dimethylallylamine TABLE 1b Examples of small molecule cationic antimicrobial compounds for use in the invention

| No. | R1 | R2 | R3 | R4 | X– | Y+ |
|---|---|---|---|---|---|---|
| 18 | 2-hydroxyethyl | 2-hydroxyethyl | 2-hydroxyethyl | benzyl | chloride | N |
| 19 | benzyl | 2-hydroxyethyl | 2-hydroxyethyl | decyl | chloride | N |
| 20 | benzyl | 2-hydroxyethyl | 2-hydroxyethyl | dodecyl | chloride | N |
| 21 | benzyl | 2-hydroxyethyl | 2-hydroxyethyl | hexadecyl | chloride | N |
| 22 | benzyl | 2-hydroxyethyl | 2-hydroxyethyl | octadecyl | chloride | N |
| 23 | benzyl | 2-hydroxyethyl | 2-hydroxyethyl | octyl | chloride | N |
| 24 | benzyl | 2-hydroxyethyl | 2-hydroxyethyl | tetradecyl | chloride | N |
| 25 | hydroxymethyl | hydroxymethyl | hydroxymethyl | hydroxymethyl | sulfate | P |
| 26 | methyl | 2-hydroxyethyl | 2-hydroxyethyl | decyl | chloride | N |
| 27 | methyl | 2-hydroxyethyl | 2-hydroxyethyl | dodecyl | chloride | N |
| 28 | methyl | 2-hydroxyethyl | 2-hydroxyethyl | hexadecyl | chloride | N |
| 29 | methyl | 2-hydroxyethyl | 2-hydroxyethyl | octadecyl | chloride | N |
| 30 | methyl | 2-hydroxyethyl | 2-hydroxyethyl | octyl | chloride | N |
| 31 | methyl | 2-hydroxyethyl | 2-hydroxyethyl | tetradecyl | chloride | N |
| 32 | methyl | Benzyl | decyl | decyl | chloride | N |
| 33 | methyl | Benzyl | dodecyl | dodecyl | chloride | N |
| 34 | methyl | Benzyl | hexadecyl | hexadecyl | chloride | N |
| 35 | methyl | Benzyl | octadecyl | octadecyl | chloride | N |
| 36 | methyl | Benzyl | tetradecyl | tetradecyl | chloride | N |
| 37 | methyl | Methyl | 3,4-dichlorobenzyl | decyl | chloride | N |
| 38 | methyl | Methyl | 3,4-dichlorobenzyl | dodecyl | chloride | N |

TABLE 1b-continued

Examples of small molecule cationic antimicrobial compounds for use in the invention

| No. | R1 | R2 | R3 | R4 | X− | Y+ |
|---|---|---|---|---|---|---|
| 39 | methyl | Methyl | 3,4-dichlorobenzyl | hexadecyl | chloride | N |
| 40 | methyl | Methyl | 3,4-dichlorobenzyl | octadecyl | chloride | N |
| 41 | methyl | Methyl | 3,4-dichlorobenzyl | octyl | chloride | N |
| 42 | methyl | Methyl | 3,4-dichlorobenzyl | tetradecyl | chloride | N |
| 43 | methyl | Methyl | 5-hydroxy-4-oxo-2(4H)-pyranylmethyl | decyl | chloride | N |
| 44 | methyl | Methyl | 5-hydroxy-4-oxo-2(4H)-pyranylmethyl | dodecyl | chloride | N |
| 45 | methyl | Methyl | 5-hydroxy-4-oxo-2(4H)-pyranylmethyl | hexadecyl | chloride | N |
| 46 | methyl | Methyl | 5-hydroxy-4-oxo-2(4H)-pyranylmethyl | octadecyl | chloride | N |
| 47 | methyl | Methyl | 5-hydroxy-4-oxo-2(4H)-pyranylmethyl | octyl | chloride | N |
| 48 | methyl | methyl | 5-hydroxy-4-oxo-2(4H)-pyranylmethyl | tetradecyl | chloride | N |
| 49 | methyl | Methyl | benzyl | decyl | chloride | N |
| 50 | methyl | Methyl | benzyl | dodecyl | bromide | N |
| 51 | methyl | Methyl | benzyl | dodecyl | chloride | N |
| 52 | methyl | Methyl | benzyl | dodecyl | naphthenate | N |
| 53 | methyl | Methyl | benzyl | dodecyl | saccharinate | N |
| 54 | methyl | Methyl | benzyl | hexadecyl | chloride | N |
| 55 | methyl | Methyl | benzyl | hexadecyl | saccharinate | N |
| 56 | methyl | Methyl | benzyl | octadecyl | chloride | N |
| 57 | methyl | Methyl | benzyl | octyl | chloride | N |
| 58 | methyl | Methyl | benzyl | tetradecyl | chloride | N |
| 59 | methyl | Methyl | benzyl | tetradecyl | saccharinate | N |
| 60 | methyl | Methyl | decyl | decyl | bicarbonate | N |
| 61 | methyl | Methyl | decyl | decyl | carbonate | N |
| 62 | methyl | Methyl | decyl | decyl | chloride | N |
| 63 | methyl | Methyl | decyloxypropyl | decyloxypropyl | chloride | N |
| 64 | methyl | Methyl | dimethylbenzyl | dodecyl | chloride | N |
| 65 | methyl | Methyl | dimethylbenzyl | hexadecyl | chloride | N |
| 66 | methyl | Methyl | dimethylbenzyl | octadecyl | chloride | N |
| 67 | methyl | Methyl | dimethylbenzyl | tetradecyl | chloride | N |
| 68 | methyl | Methyl | dodecyl | dodecyl | chloride | N |
| 69 | methyl | Methyl | dodecylbenzyl | dodecyl | chloride | N |
| 70 | methyl | Methyl | dodecylbenzyl | tetradecyl | chloride | N |
| 71 | methyl | Methyl | ethyl | cetyl | bromide | N |
| 72 | methyl | Methyl | ethyl | dodecyl | bromide | N |
| 73 | methyl | Methyl | ethyl | dodecyl | bromide | N |
| 74 | methyl | Methyl | ethyl | hexadecyl | bromide | N |
| 75 | methyl | Methyl | ethyl | octadecyl | bromide | N |
| 76 | methyl | Methyl | ethyl | tetradecyl | bromide | N |
| 77 | methyl | Methyl | ethylbenzyl | dodecyl | chloride | N |
| 78 | methyl | Methyl | ethylbenzyl | dodecyl | cyclohexylsulfamate | N |
| 79 | methyl | Methyl | ethylbenzyl | hexadecyl | chloride | N |
| 80 | methyl | Methyl | ethylbenzyl | hexadecyl | cyclohexylsulfamate | N |
| 81 | methyl | Methyl | ethylbenzyl | octadecyl | chloride | N |
| 82 | methyl | Methyl | ethylbenzyl | octadecyl | cyclohexylsulfamate | N |
| 83 | methyl | Methyl | ethylbenzyl | tetradecyl | chloride | N |
| 84 | methyl | Methyl | ethylbenzyl | tetradecyl | cyclohexylsulfamate | N |
| 85 | methyl | Methyl | hexadecyl | hexadecyl | chloride | N |
| 86 | methyl | Methyl | isononyl | decyl | chloride | N |
| 87 | methyl | Methyl | isopropylbenzyl | dodecyl | chloride | N |
| 88 | methyl | Methyl | isopropylbenzyl | hexadecyl | chloride | N |
| 89 | methyl | Methyl | isopropylbenzyl | octadecyl | chloride | N |
| 90 | methyl | Methyl | isopropylbenzyl | tetradecyl | chloride | N |
| 91 | methyl | Methyl | lauryl | lauryl | bromide | N |
| 92 | methyl | Methyl | methyl | 3-dodecyl-2-hydroxypropyl | chloride | N |
| 93 | methyl | Methyl | methyl | 3-pentadecyl-2-hydroxypropyl | chloride | N |
| 94 | methyl | Methyl | methyl | 3-tetradecyl-2-hydroxypropyl | chloride | N |
| 95 | methyl | Methyl | methyl | 3-tridecyl-2-hydroxypropyl | chloride | N |
| 96 | methyl | Methyl | methyl | cetyl | bromide | N |
| 97 | methyl | Methyl | methyl | dodecyl | bromide | N |
| 98 | methyl | Methyl | methyl | dodecyl | chloride | N |

TABLE 1b-continued

Examples of small molecule cationic antimicrobial compounds for use in the invention

| No. | R1 | R2 | R3 | R4 | X− | Y+ |
|---|---|---|---|---|---|---|
| 99 | methyl | Methyl | methyl | dodecylbenzyl | chloride | N |
| 100 | methyl | Methyl | methyl | hexadecyl | bromide | N |
| 101 | methyl | Methyl | methyl | hexadecyl | chloride | N |
| 102 | methyl | Methyl | methyl | methyldodecyl benzyl | chloride | N |
| 103 | methyl | Methyl | methyl | octadecyl | bromide | N |
| 104 | methyl | Methyl | methyl | octadecyl | chloride | N |
| 105 | methyl | Methyl | methyl | tetradecyl | bromide | N |
| 106 | methyl | Methyl | methyl | tetradecyl | chloride | N |
| 107 | methyl | Methyl | methylbenzyl | dodecyl | chloride | N |
| 108 | methyl | Methyl | methylbenzyl | tetradecyl | chloride | N |
| 109 | methyl | Methyl | octadecyl | octadecyl | chloride | N |
| 110 | methyl | Methyl | octyl | octyl | chloride | N |
| 111 | methyl | Methyl | octyloxypropyl | octyloxypropyl | chloride | N |
| 112 | methyl | Methyl | tetradecyl | tetradecyl | chloride | N |
| 113 | Morpholinium | | ethyl | tetradecyl | sulfate | N |
| 114 | Morpholinium | | ethyl | hexadecyl | sulfate | N |
| 115 | Morpholinium | | ethyl | octadecyl | sulfate | N |
| 116 | Morpholinium | | ethyl | cetyl | sulfate | N |
| 117 | Methylisoquinolinium | | | dodecyl | chloride | N |
| 118 | Methylisoquinolinium | | | tetradecyl | chloride | N |
| 119 | Methylisoquinolinium | | | hexadecyl | chloride | N |
| 120 | Methylisoquinolinium | | | octadecyl | chloride | N |
| 121 | Pyridinium | | | cetyl | bromide | N |
| 122 | Pyridinium | | | cetyl | chloride | N |

TABLE 2 examples of anionic surfactants for use in the invention

| AS | Anionic surfactant |
|---|---|
| A | Caproic acid |
| B | Caprylic acid |
| C | Capric acid |
| D | Undecylenic acid |
| E | Lauric acid |
| F | Myristic acid |
| G | Palmitic acid |
| H | Stearic acid |
| I | p-toluenesulfonic Acid Monohydrate |
| J | Dodecylsulfonate |
| K | Benzenesulfonate |
| L | Dodecylbenzene sulfonate |
| M | Hexylphosphonate |
| N | dodecylphosphonate |
| O | octadecylphosphonate |
| P | Methyl hexylphosphonate |
| Q | Methyl dodecylphosphonate |
| R | Methyl octadecylphosphonate |
| S | lauryl sulfate |
| T | sodium lauryl sulfate |
| U | dodecyl sulfate |
| V | sodium dodecyl sulfate |
| W | benzoic acid |
| X | sodium benzoate |
| Y | Octyl benzoic acid |
| Z | glycolic acid |
| AA | octadeca-dienoic acid |

TABLE 3a

Examples of polymeric complexes for use in the invention

| Complex No. | CAC No. | Amount (g) | AS letter | Amount (g) |
|---|---|---|---|---|
| 1 | 1 | 28.5 | A | 11.6 |
| 2 | 2 | 30.4 | B | 14.4 |
| 3 | 3 | 38.1 | C | 17.2 |
| 4 | 4 | 30.4 | D | 18.4 |
| 5 | 5 | 39.2 | E | 20.0 |
| 6 | 6 | 28.3 | F | 22.8 |
| 7 | 7 | 35.7 | G | 25.6 |
| 8 | 8 | 47.0 | H | 28.4 |
| 9 | 9 | 93.7 | I | 19.0 |
| 10 | 10 | 47.0 | J | 25.0 |
| 11 | 11 | 100.4 | K | 15.8 |
| 12 | 12 | 34.8 | L | 32.6 |
| 13 | 13 | 57.4 | M | 16.6 |
| 14 | 14 | 97.0 | N | 25.0 |
| 15 | 15 | 260.4 | O | 33.4 |
| 16 | 16 | 97.0 | P | 18.0 |
| 17 | 17 | 283.7 | Q | 26.4 |
| 18 | 18 | 54.1 | R | 34.8 |
| 19 | 19 | 20.7 | S | 26.6 |
| 20 | 20 | 24.0 | T | 28.8 |
| 21 | 21 | 25.9 | U | 26.6 |
| 22 | 22 | 33.7 | V | 28.8 |
| 23 | 23 | 25.9 | W | 12.2 |
| 24 | 24 | 34.8 | X | 14.4 |
| 25 | 25 | 23.9 | Y | 23.4 |
| 26 | 26 | 31.3 | Z | 7.6 |
| 27 | 27 | 42.6 | AA | 28.0 |
| 28 | 28 | 89.2 | A | 11.6 |
| 29 | 29 | 42.6 | B | 14.4 |
| 30 | 30 | 95.9 | C | 17.2 |
| 31 | 31 | 30.3 | D | 18.4 |
| 32 | 32 | 52.9 | E | 20.0 |
| 33 | 33 | 92.6 | F | 22.8 |
| 34 | 34 | 255.9 | G | 25.6 |
| 35 | 35 | 92.6 | H | 28.4 |
| 36 | 36 | 279.2 | I | 19.0 |
| 37 | 37 | 49.7 | J | 25.0 |
| 38 | 3 | 38.1 | A | 11.6 |
| 39 | 3 | 38.1 | B | 14.4 |
| 40 | 3 | 38.1 | C | 17.2 |
| 41 | 3 | 38.1 | D | 18.4 |
| 42 | 3 | 38.1 | E | 20.0 |
| 43 | 3 | 38.1 | F | 22.8 |
| 44 | 3 | 38.1 | G | 25.6 |
| 45 | 3 | 38.1 | H | 28.4 |

TABLE 3a-continued

Examples of polymeric complexes for use in the invention

| Complex No. | CAC No. | Amount (g) | AS letter | Amount (g) |
|---|---|---|---|---|
| 46 | 3 | 38.1 | I | 19.0 |
| 47 | 3 | 38.1 | L | 32.6 |
| 48 | 38 | 122.6 | F | 22.8 |
| 49 | 39 | 129.6 | G | 25.6 |
| 50 | 40 | 161.7 | H | 28.4 |
| 51 | 41 | 213.3 | I | 19.0 |
| 52 | 42 | 461.7 | J | 25.0 |

TABLE 3b

Small molecule cationic examples of complexes for use in the invention

| Complex No. | CAC No. | Amount (g) | AS letter | Amount (g) |
|---|---|---|---|---|
| 11 | 18 | 27.6 | A | 11.6 |
| 12 | 19 | 37.2 | B | 14.4 |
| 13 | 20 | 40.0 | C | 17.2 |
| 14 | 21 | 45.6 | D | 18.4 |
| 15 | 22 | 48.4 | E | 20.0 |
| 16 | 23 | 34.4 | F | 22.8 |
| 17 | 24 | 42.8 | G | 25.6 |
| 18 | 25 | 20.3 | H | 28.4 |
| 19 | 26 | 29.6 | I | 19.0 |
| 20 | 27 | 32.4 | J | 25.0 |
| 21 | 28 | 29.6 | K | 15.8 |
| 22 | 29 | 40.8 | L | 32.6 |
| 23 | 30 | 26.8 | M | 16.6 |
| 24 | 31 | 35.2 | N | 25.0 |
| 25 | 32 | 43.8 | O | 33.4 |
| 26 | 33 | 49.4 | P | 18.0 |
| 27 | 34 | 60.6 | Q | 26.4 |
| 28 | 35 | 66.3 | R | 34.8 |
| 29 | 36 | 55.0 | S | 26.6 |
| 30 | 37 | 38.1 | T | 28.8 |
| 31 | 38 | 40.9 | U | 26.6 |
| 32 | 39 | 38.1 | V | 28.8 |
| 33 | 40 | 49.3 | W | 12.2 |
| 34 | 41 | 35.3 | X | 14.4 |
| 35 | 42 | 43.7 | Y | 23.4 |
| 36 | 43 | 34.6 | Z | 7.6 |
| 37 | 44 | 37.4 | AA | 28.0 |
| 38 | 45 | 43.0 | A | 11.6 |
| 39 | 46 | 45.8 | B | 14.4 |
| 40 | 47 | 31.8 | C | 17.2 |
| 41 | 48 | 40.2 | D | 18.4 |
| 42 | 49 | 31.2 | E | 20.0 |
| 43 | 50 | 38.4 | F | 22.8 |
| 44 | 51 | 34.0 | G | 25.6 |
| 45 | 52 | 71.5 | H | 28.4 |
| 46 | 53 | 48.8 | I | 19.0 |
| 47 | 54 | 39.6 | J | 25.0 |
| 48 | 55 | 54.4 | K | 15.8 |
| 49 | 56 | 42.4 | L | 32.6 |
| 50 | 57 | 28.4 | M | 16.6 |
| 51 | 58 | 36.8 | N | 25.0 |
| 52 | 59 | 51.6 | O | 33.4 |
| 53 | 60 | 38.8 | P | 18.0 |
| 54 | 61 | 38.7 | Q | 26.4 |
| 55 | 62 | 36.2 | R | 34.8 |
| 56 | 63 | 47.8 | S | 26.6 |
| 57 | 64 | 36.8 | T | 28.8 |
| 58 | 65 | 42.4 | U | 26.6 |
| 59 | 66 | 45.2 | V | 28.8 |
| 60 | 67 | 39.6 | W | 12.2 |
| 61 | 68 | 41.8 | X | 14.4 |
| 62 | 69 | 50.8 | Y | 23.4 |
| 63 | 70 | 53.6 | Z | 7.6 |
| 64 | 71 | 40.7 | AA | 28.0 |
| 65 | 72 | 32.2 | A | 11.6 |
| 66 | 73 | 32.2 | B | 14.4 |
| 67 | 74 | 37.8 | C | 17.2 |
| 68 | 75 | 40.7 | D | 18.4 |
| 69 | 76 | 35.0 | E | 20.0 |
| 70 | 77 | 36.8 | F | 22.8 |
| 71 | 78 | 51.2 | G | 25.6 |
| 72 | 79 | 42.4 | H | 28.4 |
| 73 | 80 | 56.8 | I | 19.0 |
| 74 | 81 | 31.2 | J | 25.0 |
| 75 | 82 | 45.6 | K | 15.8 |
| 76 | 83 | 39.6 | L | 32.6 |
| 77 | 84 | 54.0 | M | 16.6 |
| 78 | 85 | 53.0 | N | 25.0 |
| 79 | 86 | 34.0 | O | 33.4 |
| 80 | 87 | 38.2 | P | 18.0 |
| 81 | 88 | 43.8 | Q | 26.4 |
| 82 | 89 | 46.6 | R | 34.8 |
| 83 | 90 | 41.0 | S | 26.6 |
| 84 | 91 | 46.3 | T | 28.8 |
| 85 | 92 | 32.2 | U | 26.6 |
| 86 | 93 | 36.4 | V | 28.8 |
| 87 | 94 | 35.0 | W | 12.2 |
| 88 | 95 | 33.6 | X | 14.4 |
| 89 | 96 | 39.2 | Y | 23.4 |
| 90 | 97 | 30.8 | Z | 7.6 |
| 91 | 98 | 26.4 | AA | 28.0 |
| 92 | 99 | 35.4 | A | 11.6 |
| 93 | 100 | 36.4 | B | 14.4 |
| 94 | 101 | 32.0 | C | 17.2 |
| 95 | 102 | 36.8 | D | 18.4 |
| 96 | 103 | 39.2 | E | 20.0 |
| 97 | 104 | 34.8 | F | 22.8 |
| 98 | 105 | 33.6 | G | 25.6 |
| 99 | 106 | 29.2 | H | 28.4 |
| 100 | 107 | 41.8 | I | 19.0 |
| 101 | 108 | 47.4 | J | 25.0 |
| 102 | 109 | 58.6 | K | 15.8 |
| 103 | 110 | 30.6 | L | 32.6 |
| 104 | 111 | 42.2 | M | 16.6 |
| 105 | 112 | 47.4 | N | 25.0 |
| 106 | 113 | 37.6 | O | 33.4 |
| 107 | 114 | 40.4 | P | 18.0 |
| 108 | 115 | 43.2 | Q | 26.4 |
| 109 | 116 | 43.2 | R | 34.8 |
| 110 | 117 | 36.2 | S | 26.6 |
| 111 | 118 | 39.0 | T | 28.8 |
| 112 | 119 | 41.8 | U | 26.6 |
| 113 | 120 | 44.6 | V | 28.8 |
| 114 | 121 | 42.6 | W | 12.2 |
| 115 | 122 | 38.2 | X | 14.4 |

TABLE 4 examples of complexes used in coatings and types of coatings formed

| Exp. No. | CAC-AS complex (ex. # and amount) | Type of coating |
|---|---|---|
| 1 | 10-2.5% wt. in dry coating | Syntran 1693 (steel coil coating) |
| 2 | 10-5% wt. in dry coating | Porter Paint Base PP13 (latex wall paint) |
| 3 | 10-5% wt. in dry coating | SCW-2710 (packaging clear coat #1) |
| 4 | 10-5% wt. in dry coating | Sun Coat W/B Gloss (packaging clear coat #2) |
| 5 | 10-5% wt. in dry coating | Pure Wax (retail floor wax) |
| 6 | 10-5% wt. in dry coating | Polyurethane varnish (retail water-base) |

TABLE 4-continued examples of complexes used in coatings
and types of coatings formed

| Exp. No. | CAC-AS complex (ex. # and amount) | Type of coating |
|---|---|---|
| 7 | 10-100% wt. in dry coating | Complex used as a stand-alone coating |
| 8 | 10-100% wt. in dry coating | MycroFence AM-216 (proprietary formulation) |

TABLE 5

Efficacy of the coating against S. aureus

| Coating Exp. No. | Bacteria Chosen | Exposure Time | % Reduction | Log Reduction |
|---|---|---|---|---|
| 1 | S. aureus | 24 hours | >99.998% | >4.67 |
| 2 | S. aureus | 24 hours | >99.998% | >4.62 |
| 3 | S. aureus | 24 hours | >99.998% | >4.62 |
| 4 | S. aureus | 24 hours | 99.998% | 4.62 |
| 7 | S. aureus | 24 hours | >99.998% | >4.67 |
| 8 | S. aureus | 24 hours | 98.15% | 1.73 |
| 8 | S. aureus | 24 hours | >99.998 | >4.62 |

Liquid mixture stability was assessed for certain examples provided above. The dispersion stability for the antimicrobial compound-containing mixture was comparable to the dispersion stability for a comparative mixture lacking the antimicrobial compound and its associated anionic surfactant.

Antimicrobial activity was assessed for selected examples from Table 4. The antimicrobial activity of the cationic antimicrobial compound was essentially not diminished when incorporated into liquid mixtures and coatings formed from those mixtures.

Consequently, in view of the disclosure herein, the invention includes but is not limited to the following:

1. A composition comprising a mixture of:
    a. a carrier liquid;
    b. a first complex of a cationic antimicrobial compound and a first anionic surfactant dispersed in the carrier liquid;
    c. a second complex of a second anionic surfactant and at least one member selected from particles dispersed in the carrier liquid; and
    d. said mixture is a suspension, a colloid, a latex, and/or an emulsion.
2. A liquid coating composition comprising a mixture containing a cationic antimicrobial compound complexed with an associated first anionic surfactant and wherein the mixture contains more total surfactant than a comparative liquid coating composition that is otherwise identical but lacks the cationic antimicrobial compound and the associated first anionic surfactant.
3. A composition comprising a mixture of a carrier liquid and a complex, wherein the complex has a cationic antimicrobial polymeric portion and an anionic surfactant-compatibilizing portion, wherein the complex has an ionic attraction between the cationic antimicrobial portion and the anionic surfactant-compatibilizing portion that is greater than an ionic attraction of either portion to any other ions present in the liquid carrier, and wherein
    a. the complex after removal of the liquid carrier has sufficient antimicrobial activity to substantially reduce the presence of bacteria; and
    b. the anionic surfactant-compatibilizing portion suspends the complex in the carrier liquid; and
    c. the mixture without addition of the complex is a suspension, latex, or colloid; and
    d. the mixture remains as a suspension, latex, or colloid with addition of the complex.
4. A composition comprising a dispersion of a plurality of dispersible antimicrobial complexes that comprise ions of a cationic antimicrobial compound in a carrier liquid, wherein the ions of the cationic antimicrobial molecules in the carrier liquid are complexed to ions of a first anionic surfactant, wherein the dispersion has ions of a second anionic surfactant, and the ions of the first anionic surfactant have an ionic attraction greater in magnitude than an ionic attraction of the ions of the second anionic surfactant to the ions of the cationic antimicrobial compound.
5. A method of making a coating material comprising
    a. dispersing a complex of a cationic antimicrobial compound and a first anionic surfactant in a carrier liquid containing a second anionic surfactant;
    b. wherein an affinity of the cationic antimicrobial compound for the first anionic surfactant is greater than or equal to an affinity of the cationic antimicrobial compound for the second anionic surfactant.
6. A method of making a second latex comprising mixing a first latex having a dispersed binder with a cationic antimicrobial compound and a first anionic surfactant.
7. A method of using a first anionic surfactant comprising
    a. adding a cationic antimicrobial compound to a mixture that includes a second anionic surfactant, wherein the cationic antimicrobial compound destabilizes a disperse phase in the mixture in the absence of addition of the first anionic surfactant and the mixture is a latex, a suspension, or a colloid; and
    b. adding the first anionic surfactant to the mixture to prevent the cationic antimicrobial compound from destabilizing the disperse phase in the mixture.
8. A composition or method of any paragraph above, wherein the cationic antimicrobial compound is polymeric.
9. A composition or method of paragraph 8, wherein the cationic antimicrobial compound is hydrophilic.
10. A composition or method of paragraph 9, wherein the antimicrobial compound has a discrete hydrophilic domain.
11. A composition or method of paragraph 10, wherein the discrete hydrophilic domain comprises PEGMA.
12. A composition or method of paragraph 11, wherein the PEGMA comprises PEGMEMA.
13. A composition or method of any of paragraphs 8-12, wherein the cationic antimicrobial compound comprises an alkyl-quaternized nitrogen.
14. A composition or method of paragraph 13, wherein the cationic antimicrobial compound comprises a copolymer of alkyl-quaternized vinyl pyridine and a hydrophilic comonomer.
15. A composition or method of paragraph 14, wherein the alkyl is an alkyl having between 4 and 12 carbon atoms.
16. A composition or method of paragraph 14 or paragraph 15, wherein the alkyl-quaternized vinyl pyridine is alkyl-quaternized 4-vinyl pyridine and the hydrophilic comonomer comprises a polymer of PEGMA.
17. A composition or method of paragraph 14 or paragraph 15, wherein the alkyl-quaternized vinyl pyridine is alkyl-quaternized 2-vinyl pyridine and the hydrophilic comonomer comprises a polymer of PEGMA.

18. A composition or method of paragraph 16 or paragraph 17, wherein the polymer of PEGMA comprises PEGMEMA.

19. A composition or method of any of paragraphs 13-18, wherein the alkyl group comprises a linear butyl group.

20. A composition or method of any of paragraphs 13-18, wherein the alkyl group comprises a linear hexyl group.

21. A composition or method of any of paragraphs 1-7, wherein the cationic antimicrobial compound is not a polymer.

22. A composition or method of paragraph 21, wherein the cationic antimicrobial compound has a hydrophilic domain.

23. A composition or method of paragraph 21 or paragraph 22, wherein the discrete hydrophilic domain comprises PEGMA.

24. A composition or method of paragraph 23, wherein the PEGMA comprises PEGMEMA.

25. A composition or method of any of paragraphs 8-12 and 21-24, wherein the cationic antimicrobial compound comprises an alkyl-quaternized nitrogen.

26. A composition or method of any paragraph above, wherein the first anionic surfactant is sufficiently hydrophilic to suspend the cationic antimicrobial compound in water.

27. A composition or method of paragraph 9, wherein the first anionic surfactant and the hydrophilic cationic antimicrobial compound together suspend the cationic antimicrobial compound in water.

28. A composition or method of any paragraph above, wherein the first anionic surfactant comprises a phosphonate, a sulfonate, a sulfate monoester, a benzoate, a carboxylate, or a glycolic moiety.

29. A composition or method of paragraph 28, wherein the first anionic surfactant comprises a sulfonate and/or a carboxylate.

30. A composition of any of paragraphs 26-29, wherein the first anionic surfactant has a hydrophobic portion having at least 6 carbon atoms.

31. A composition of paragraph 30, wherein the first anionic surfactant has a hydrophobic portion having at least 8 carbon atoms.

32. A composition of any paragraph above, wherein the first anionic surfactant has a hydrophobic portion having an aromatic group.

33. A composition of paragraph 32, wherein the aromatic group has an alkyl substituent.

34. A composition of paragraph 33, wherein the alkyl substituent is hydrophobic and has at least 6 carbon atoms.

35. A composition of paragraph 34, wherein the alkyl substituent has 12 or fewer carbon atoms in linear or branched configuration.

36. A composition or method of any paragraph above, wherein the carrier liquid is water.

The examples and discussion above focus on water as the carrier liquid. However, examples and discussion above are equally applicable to an organic liquid such as an oil being the carrier liquid.

All patents, applications, and other publications mentioned herein are incorporated by reference in their entirety for all purposes, as if each was put forth in full herein.

What is claimed is:

1. A composition comprising a mixture of:
   (a) a carrier liquid comprising water;
   (b) a first complex of a cationic antimicrobial compound and a first anionic surfactant dispersed in the carrier liquid;
   (c) a second complex of a second anionic surfactant and at least one member selected from particles and immiscible droplets dispersed in the carrier liquid; and
   (d) said mixture is a colloid, a suspension, or a latex; and wherein
   (e) the cationic antimicrobial compound comprises a copolymer of a quaternized nitrogen-containing monomer and a hydrophilic comonomer, wherein
   (f) the copolymer consists of an alkyl-quaternized 4-vinyl pyridine and poly(ethylene glycol) methyl ether methacrylate.

2. The composition according to claim 1, wherein the alkyl group of the alkyl-quaternized 4-vinyl pyridine has between 4 and 12 carbon atoms.

3. The composition according to claim 2, wherein the alkyl group comprises a linear butyl group.

4. The composition according to claim 2, wherein the alkyl group comprises a linear hexyl group.

5. The composition of claim 1, wherein the first anionic surfactant is sufficiently hydrophilic to suspend the copolymer in the water.

6. The composition of claim 5, wherein the hydrophilic comonomer and the first anionic surfactant together are sufficient to suspend the copolymer in the water, and each of the hydrophilic comonomer and the first anionic surfactant alone are insufficient to suspend the copolymer in the water.

7. The composition of claim 1, wherein the first anionic surfactant comprises a phosphonate, a sulfonate, a sulfate monoester, a benzoate, a carboxylate, or a glycolic moiety.

8. The composition of claim 7, wherein the first anionic surfactant has a greater affinity for the copolymer than any other anions present in the carrier liquid.

9. The composition of claim 8, wherein the alkyl group of the alkyl-quaternized 4-vinyl pyridine has at least 4 carbon atoms.

10. The composition of claim 7, wherein the first anionic surfactant has a hydrophobic portion having at least 6 carbon atoms.

11. The composition of claim 10, wherein the hydrophobic portion of the first anionic surfactant has at least 8 carbon atoms.

12. The composition of claim 11, wherein the alkyl group of the alkyl-quaternized 4-vinyl pyridine has at least 4 carbon atoms.

13. The composition of claim 10, wherein the alkyl group of the alkyl-quaternized 4-vinyl pyridine has at least 4 carbon atoms.

14. The composition of claim 7, wherein the first anionic surfactant has a hydrophobic portion having an aromatic group.

15. The composition of claim 14, wherein the aromatic group has a hydrophobic substituent having at least 6 carbon atoms.

16. The composition of claim 15, wherein the hydrophobic substituent comprises an alkyl group.

17. The composition of claim 16, wherein the alkyl group of the alkyl-quaternized 4-vinyl pyridine has at least 4 carbon atoms.

18. The composition of claim 14, wherein the alkyl group of the alkyl-quaternized 4-vinyl pyridine has at least 4 carbon atoms.

19. The composition of claim 15, wherein the alkyl group of the alkyl-quaternized 4-vinyl pyridine has at least 4 carbon atoms.

\* \* \* \* \*